US010037058B2

(12) United States Patent
Kato

(10) Patent No.: US 10,037,058 B2
(45) Date of Patent: Jul. 31, 2018

(54) MULTIAXIAL HINGE AND ELECTRONIC DEVICE USING THE SAME

(71) Applicant: KEM HONGKONG LIMITED, Kowloon (HK)

(72) Inventor: Hideo Kato, Kanagawa (JP)

(73) Assignee: KEM HONGKONG LIMITED, Kowloon (HK)

( * ) Notice: Subject to any disclaimer, the term of this patent is extended or adjusted under 35 U.S.C. 154(b) by 0 days.

(21) Appl. No.: 15/692,258

(22) Filed: Aug. 31, 2017

(65) Prior Publication Data

US 2018/0059740 A1 Mar. 1, 2018

(30) Foreign Application Priority Data

Sep. 1, 2016 (JP) .................................. 2016-171194

(51) Int. Cl.
*G06F 1/16* (2006.01)
*E05D 3/06* (2006.01)
*F16C 11/04* (2006.01)

(52) U.S. Cl.
CPC ............. *G06F 1/1681* (2013.01); *E05D 3/06* (2013.01); *F16C 11/04* (2013.01); *G06F 1/1616* (2013.01); *E05Y 2900/606* (2013.01)

(58) Field of Classification Search
CPC .................................................. G06F 1/1681
See application file for complete search history.

(56) References Cited

U.S. PATENT DOCUMENTS

| 9,540,855 | B2 * | 1/2017 | Kato | .......................... E05D 3/12 |
| 9,915,086 | B2 * | 3/2018 | Kato | ....................... E05D 3/122 |
| 2002/0023314 | A1 * | 2/2002 | Goldsmith | .............. E05D 3/186 16/372 |
| 2005/0122671 | A1 * | 6/2005 | Homer | ................... G06F 1/1618 361/679.27 |
| 2010/0232100 | A1 * | 9/2010 | Fukuma | .................. F16G 13/18 361/679.01 |

(Continued)

FOREIGN PATENT DOCUMENTS

| JP | 10-26754 A | 1/1998 |
| JP | 2009-187509 A | 8/2009 |

(Continued)

*Primary Examiner* — Adrian S Wilson
(74) *Attorney, Agent, or Firm* — Griffin and Szipl PC

(57) ABSTRACT

In order to provide a multiaxial hinge suitably used in an electronic device, such as a notebook PC having a flexible display sheet, and an electronic device using such a multiaxial hinge, the multiaxial hinge is a multiaxial hinge used as attached below a flexible and touch-operable display sheet for opening and closing the first casing and the second casing, the display sheet being attached so as to cover both inner surfaces of the both casings, several hinge shafts are provided, wherein a first bracket attached to the first casing and a second bracket attached to the second casing are coupled together via several coupling parts, and a synchronous rotation unit, a stopper and a friction unit either all in cooperation or one independently from other are provided on each of the hinge shafts, the multiaxial hinge is designed such that a bent portion is formed on the inner surfaces in a closed state of the first casing and the second casing, and that the first casing and the second casing are flush in a fully opened state of the casings.

10 Claims, 25 Drawing Sheets

(56) References Cited

U.S. PATENT DOCUMENTS

| | | | |
|---|---|---|---|
| 2011/0000136 A1* | 1/2011 | Brun | E05D 3/06 49/358 |
| 2011/0157780 A1* | 6/2011 | Wang | G06F 1/1681 361/679.01 |
| 2014/0196253 A1* | 7/2014 | Song | G06F 1/1601 16/225 |
| 2014/0245569 A1* | 9/2014 | Cho | E05D 3/122 16/370 |
| 2016/0083987 A1* | 3/2016 | Xia | G06F 1/1681 16/223 |
| 2016/0132075 A1* | 5/2016 | Tazbaz | G06F 1/1681 361/679.27 |

FOREIGN PATENT DOCUMENTS

| | | |
|---|---|---|
| JP | 2016-1052 A | 1/2016 |
| JP | 2016-169813 A | 9/2016 |

\* cited by examiner

FIG. 15A
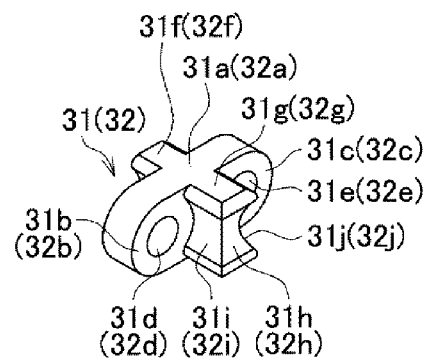
FIG. 15C
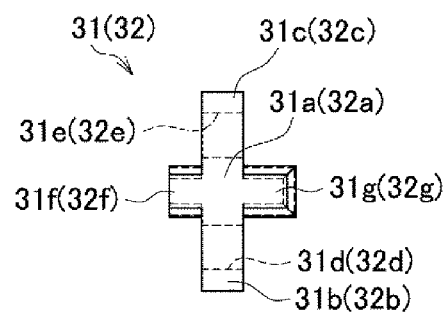
FIG. 15E  FIG. 15B  FIG. 15D
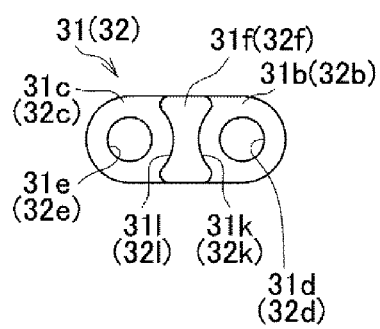 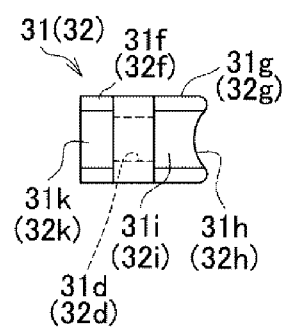 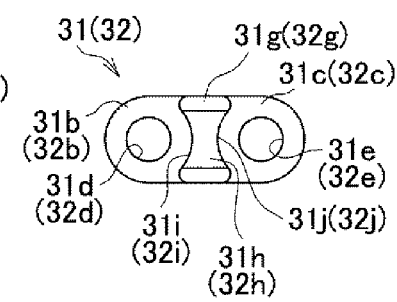

MULTIAXIAL HINGE AND ELECTRONIC DEVICE USING THE SAME

This application claims priority from Japanese Patent Application No. 2016-171194, filed Sep. 1, 2016, the entire disclosure of which is incorporated herein by reference.

FIELD OF THE INVENTION

The invention relates to a multiaxial hinge suitably used in an electronic device, such as a notebook PC having a flexible display sheet. The invention further relates to an electronic device using such a multiaxial hinge.

BACKGROUND ART

Conventionally, a biaxial hinge which couples a first casing of a notebook PC provided with a display portion and a second casing provided with a keyboard portion such that these casings can open and close relative to each other via a synchronous rotation mechanism is known from JP Laid-Open Patent Application No. 2016-1052. The synchronous rotation mechanism of the known biaxial hinge comprises a first gear and a second gear respectively attached to a first hinge shaft and a second hinge shaft, an intermediate gear provided between a first gear and a second gear; the synchronous rotation mechanism is structured such that it allows the first casing and the second casing to synchronously open and close, so that a biaxial hinge which allows for a satisfactory opening and closing operation and has a favorable efficiency and operability.

In the same manner, a triaxial hinge comprising a synchronous rotation mechanism between a first hinge shaft and a second hinge shaft is also disclosed by an application according to JP Patent Application No. 2016-96374 and a quadraxial hinge—by an application according to JP Patent Application No. 2015-50454.

On the other hand, though a liquid crystal using a glass plate was widely used as a display portion attached to a second casing, in recent years, a (flexible) display sheet of flexible material wherein a liquid crystal is sandwiched by resin sheets of flexible material, as is described in JP Laid-Open Patent Application No. H10-26754, and a (flexible) organic EL (organic luminescence) of flexible material, as is described in JP Laid-Open Patent Application No. 2009-187509, came into practical use, and large-sized, flexible display sheets are now acceptable to users also in terms of price. Therefore, not only the second casing but also the first casing of the notebook PC are entirely covered with the above-mentioned touch-panel type display sheet, so that a large-screen display becomes available without a keyboard on the first casing, while a touch-panel function also assures functionality of keyboard.

In this case, if the first casing and the second casing are coupled using the conventional hinges as described e.g. in the above-mentioned patent documents, that is JP Laid-Open Patent Application No. 2016-1052, JP Patent Applications Nos. 2016-96374 and 2015-50454, there are problems with flexible and touch operable display sheet of organic EL substrate, etc. being attached to the casings so as to cover the both sides of the hinges that, when they are bent in order to close the first casing and the second casing, they are bent too much so that they easily damage the display sheet of organic EL substrate, etc., and that, if they have rugged surfaces, a force unevenly applied to localized spot(s) on the display sheet during touch input easily causes damages to the display sheet.

SUMMARY OF THE INVENTION

The invention is made to solve the above-mentioned problems. An object of the invention is to provide a multiaxial hinge which couples a first casing and a second casing of a notebook PC, wherein the inner surface sides of these casings are totally covered with a single flexible display sheet using liquid crystal and organic EL, such that these casings are openable and closable relative to each other; the hinge prevents a damage to the display sheet due to a too small curvature radius of the bent display sheet in a closed state of the casings, enables the casings to stop at any opening and closing angle at opening and closing operations of the casings, and further to open and close in a synchronized manner. An object of the invention is further to provide, making use of this multiaxial hinge, a thin electronic device with flexible display sheet of a large screen size, which is also convenient for handling.

In addition to the above-mentioned object, an object of the invention is further to provide a multiaxial hinge which enables the first casing and the second casing to automatically open and close from a predetermined opening and closing angle, when the both casings are opened up to the maximum opening angle or closed up to the maximum closing angle, and the electronic device with the multiaxial hinge.

To solve the above-mentioned problem, as in the first aspect of the invention, a multiaxial hinge according to the invention is the one used as attached below a flexible and touch-operable display sheet for opening and closing the first casing and the second casing, wherein the display sheet is attached so as to cover both inner surfaces of the both casings, and it is characterized in that a plurality of hinge shafts is provided, a first bracket attached to the first casing and a second bracket attached to the second casing are coupled together via a plurality of coupling members, and a synchronous rotation mechanism, a stopper means and a friction mechanism either all in cooperation or each independently from each other are provided on each of the hinge shafts, and the multiaxial hinge is designed, such that a bent portion is formed on the inner surfaces in a closed state of the first casing and the second casing, and the first casing and the second casing are flush in a fully opened state of the casings.

Still further, to solve the above-mentioned problem, as in the second aspect of the invention, a multiaxial hinge according to the invention is the one used as attached below a flexible and touch-operable display sheet for opening and closing the first casing and the second casing, wherein the display sheet is attached so as to cover both inner surfaces of the both casings, and it is characterized in that a plurality of hinge shafts is provided, a first bracket attached to the first casing and a second bracket attached to the second casing are coupled together via a plurality of coupling members, and a synchronous rotation mechanism, a stopper means, a friction mechanism and a drawing mechanism either all in cooperation or each independently from each other are provided on each of the hinge shafts, and the multiaxial hinge is designed, such that a bent portion is formed on the inner surfaces in a closed state of the first casing and the second casing, and the first casing and the second casing are flush in a fully opened state of the casings.

To solve the above-mentioned problem, as in the third aspect of the invention, a multiaxial hinge is characterized in that the plurality of hinge shafts is made up of a first main hinge shaft, a second main hinge shaft, a first sub hinge shaft and a second sub hinge shaft, and the coupling members include coupling members rotatably coupling adjacent ones of the plurality of hinge shafts.

In a preferable embodiment of a plurality of multiaxial hinge according to the invention, as in the fourth aspect of the invention, it is characterized in that the coupling members are made up of a coupling member coupling said first bracket and the second bracket to a first main hinge shaft and a first sub hinge shaft, such that the first main hinge shaft and the first sub hinge shaft are rotatable, a coupling member coupling the first sub hinge shaft and the second sub hinge shaft to a second main hinge shaft and a second sub hinge shaft, such that the second main hinge shaft and the second sub hinge shaft are rotatable, and a coupling member coupling a first sub hinge shaft to a second sub hinge shaft, such that the first sub hinge shaft to the second sub hinge shaft are rotatable.

In a preferable embodiment of a plurality of multiaxial hinge according to the invention, as in the fifth aspect of the invention, it is characterized in that the synchronous rotation mechanism comprises: a first attaching member and a second attaching member, respectively attached to a first main hinge shaft and a second main hinge shaft, with their respective rotation being restrained, wherein the first attaching member and the second attaching member respectively comprises bevel-gear-shaped drive gears having the first main hinge shaft and the second main hinge shaft as central axes, on their shaft end surfaces, wherein the first main hinge shaft and the second main hinge shaft are inserted through the first attaching member and the second attaching member, and wherein the first bracket and the second bracket are attached to the first attaching member and the second attaching member; a rotating block, wherein the first sub hinge shaft and the second sub hinge shaft are inserted through the rotating block, and wherein the rotating block comprises bevel-gear-shaped driven gears having the first sub hinge shaft and the second sub hinge shaft as central axes, on its shaft end surfaces; a first twin-bevel-gear-shaped intermediate gear for transmitting a rotation of a first bevel-gear-shaped drive gear of the first attaching member to a first bevel-gear-shaped driven gear of the rotating block; a second twin-bevel-gear-shaped intermediate gear for transmitting a rotation of a first bevel-gear-shaped drive gear of the first attaching member to a second bevel-gear-shaped driven gear of the rotating block; a third twin-bevel-gear-shaped intermediate gear rotatably held by the rotating block so as to rotate around an axis parallel to an axis of the first twin-bevel-gear-shaped intermediate gear and the second twin-bevel-gear-shaped intermediate gear; a coupling member which is one of the plurality of coupling members, and comprises a bevel-gear-shaped gear meshed with one of the bevel-gear-shaped driven gears, wherein the first main hinge shaft and the first sub hinge shaft are inserted through the coupling member; and a coupling member which is one of the plurality of coupling members, and comprises a bevel-gear-shaped gear meshed with other of the bevel-gear-shaped driven gears, wherein the second main hinge shaft and the second sub hinge shaft are inserted through the coupling member.

In a preferable embodiment of a plurality of multiaxial hinge according to the invention, as in the sixth aspect of the invention, it is characterized in that the stopper means comprises: a coupling member which is one of the plurality of coupling members, wherein the first main hinge shaft and the first sub hinge shaft are inserted through the coupling member, and a stopper concave portion or a stopper convex portion is formed on its outer surface; a coupling member which is further one of coupling members, wherein a second main hinge shaft and a second sub hinge shaft are inserted through the coupling member, and a stopper concave portion or a stopper convex portion is formed on its outer surface; and a coupling member which is one of coupling members adjacent to said two coupling members, wherein the stopper concave portion or the stopper convex portion are formed, the first sub hinge shaft and the second sub hinge shaft are inserted through the coupling member, the coupling member comprising a stopper convex portion and a stopper concave portion engaging the stopper concave portion or the stopper convex portion of the two coupling members.

In a preferable embodiment of a plurality of multiaxial hinge according to the invention, as in the seventh aspect of the invention, it is characterized in that the friction mechanism attached to the first main hinge shaft and the second main hinge shaft, with its rotation being restrained comprises: a first friction washer and a second friction washer; two of the plurality of coupling members, each of which abuts against one surface of one of the first friction washer and the second friction washer, the first main hinge shaft and the second main hinge shaft are rotatably inserted through the coupling members; a first cam disc and a second cam disc, each comprising a surface with a waffle-knurl pattern abutting against other surface of one of the first friction washer and the second friction washer, wherein the first cam disc and the second cam disc are provided so as to rotate together with the two coupling members on the first main hinge shaft and the second main hinge shaft; and a first elastic means and a second elastic means for bringing the two coupling members and the first cam disc and the second cam disc into press contact with the first friction washer and the second friction washer.

In a preferable embodiment of a plurality of multiaxial hinge according to the invention, as in the eighth aspect of the invention, it is characterized in that the drawing mechanism comprises: a first cam disc and a second cam disc provided so as to rotate together with the two coupling members on the first main hinge shaft and the second main hinge shaft as well as with two of the plurality of coupling members provided so as to rotate relative to the first main hinge shaft and the second main hinge shaft; a first cam follower and a second cam follower provided on the first main hinge shaft and the second main hinge shaft with a rotation thereof being restrained, each comprising a cam surface working together with cam surfaces of the first cam disc and the second cam disc; and a first elastic means and a second elastic means for bringing the cam surface of said first cam follower and the second cam follower into press contact with the cam surfaces of the first cam disc and the second cam disc.

An electrical device according to the invention, as in the ninth aspect of the invention, is characterized in that it uses the multiaxial hinge according to one of the first to the eighth aspects.

In a preferable embodiment of the electrical device according to the invention, as in the tenth aspect of the invention, it is characterized in that a single-piece flexible display sheet is provided so as to widely cover inner surfaces of the first casing and the second casing, and a substantially central portion of said display sheet is fixed to said multiaxial hinge.

The present invention is constructed as described above, therefore, the multiaxial hinges can be provided, wherein they have effects, that the first casing and the second casing of the electronic device such as a notebook PC which are covered with a single-piece flexible display sheet are coupled below the display sheet via the multiaxial hinges according to the invention; that the bent portion can be formed, wherein the display sheet does not break in the closed state of the first casing and the second casing; that the first casing and the second casing can be synchronously opened and closed; and that in the fully opened state of the first casing and the second casing, the multiaxial hinges are flush with the first casing and the second casing without protruding upwards. Still further, with the friction mechanisms as described above, the first casing and the second casing can be opened and closed at free stop, as well as with the drawing mechanisms, the first casing and the second casing can be automatically opened and closed, just before their closed state and fully opened state, and in this sense, the multiaxial hinges have excellent efficiency and operability of the opening and closing operation; still further, using such multiaxial hinges, an easy-to-handle, thin electronic device with a large sized and flexible display sheet can be provided.

BRIEF DESCRIPTION OF THE DRAWINGS

FIGS. 15A to 15E show a further different type of coupling member of a multiaxial hinge as shown in FIGS. 5 and 6, FIG. 15A being its perspective view, FIG. 15B—its elevation view, FIG. 15C—its plan view, FIG. 15D—its right hand side view and FIG. 15E—its left hand side view;

FIG. 24A relating to their closed state, FIG. 24B to a state in which they are opened 90 degrees and FIG. 24A to a state in which they are opened 180 degrees.

EMBODIMENTS

Hereinafter, reference is made based on the drawings to the embodiments in which a multiaxial hinge according to the invention is applied to a notebook PC being an example of an electrical device. However, targeted electrical devices using the multiaxial hinge according to the invention are not limited to a notebook PC, but the multiaxial hinge according to the invention is also widely applicable to other electrical devices such as a mobile PC, PDA and others, having a first casing and a second casing which are coupled to each other, such that the casings can open and close relative to each other.

Figure 1A:
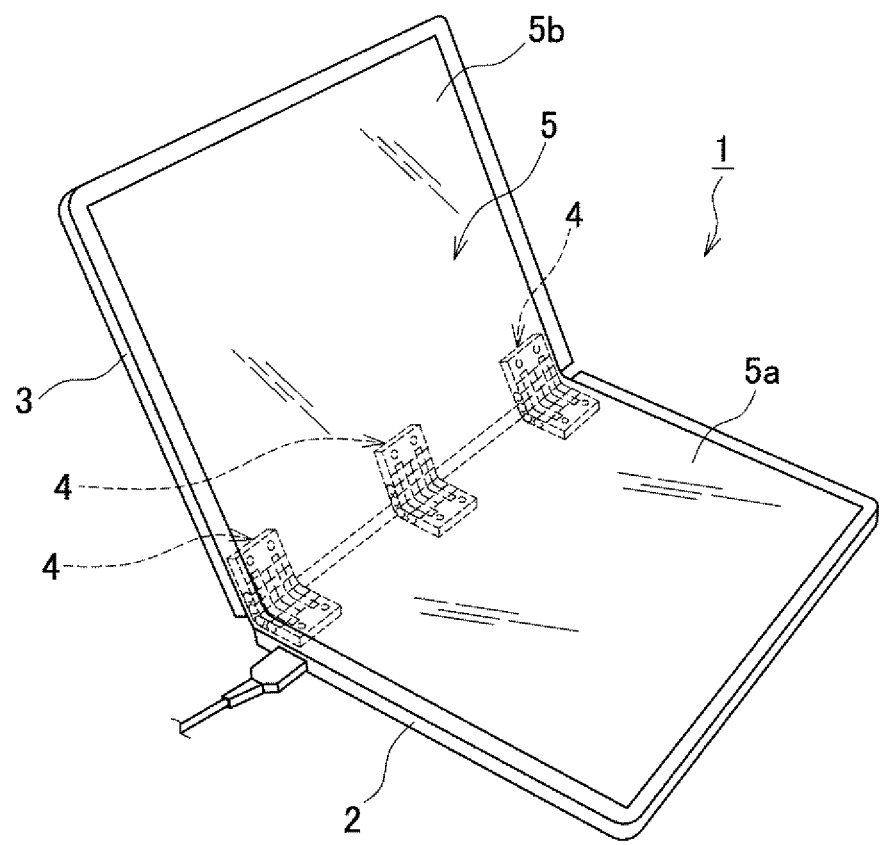
FIGS. 1A and 1B show a notebook PC being an example of a terminal device, with a multiaxial hinge according to the invention being attached thereto, FIG. 1A being its perspective view as seen from front side, while a first casing and a second casing are opened 120 degrees, and FIG. 1B being its perspective view as seen from rear side, while a first casing and a second casing are closed.
Figure 1B:
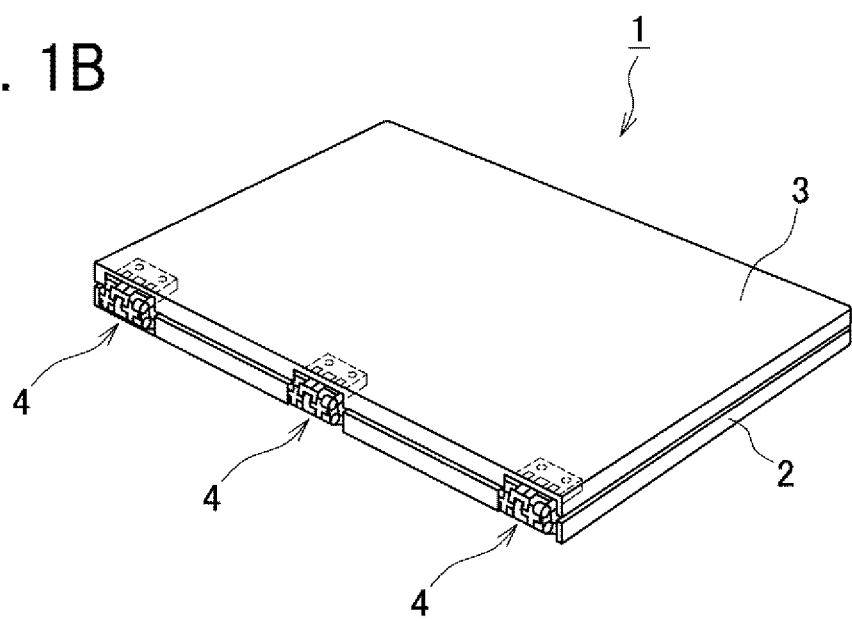

FIGS. 1A and 1B show a notebook PC 1 being an example of an electrical device using multiaxial hinges 4, 4, 4 according to the invention. The notebook PC 1 comprises a first casing 2 provided with a key board portion 2a and a second casing 3 provided with a display portion 3a, wherein the casings are coupled to each other via multiaxial hinges 4, 4, 4 according to the invention at spots on the right and left sides, as well as the central portions of their respective rear portions of the first casing 2 and the second casing 3, such that the casings can open and close relative to each other. Here, the casings are coupled via multiaxial hinges 4, 4, 4 according to the invention, not only at two spots on the right and left, but also at the central portion, so that the both casings are stably coupled and rugged surfaces can be successfully prevented from being generated on a touch-panel type flexible display sheet 5 (as described below). In an embodiment as shown in the drawings, attaching screws 6, 6 (see FIG. 2) are inserted into attaching screw holes 56e, 56e (see FIGS. 3, 4) provided on a first bracket 56 of each multiaxial hinge 4, and these attaching screws 6, 6 are further screwed into screw holes (not shown) provided on a first casing 2 of the notebook PC 1, so that the first bracket 56 of each multiaxial hinge 4 is attached to the first casing 2. In the same manner, attaching screws 7, 7 (see FIG. 2) are inserted into attaching screw holes 57e, 57e (see FIGS. 3, 4) provided on a second bracket 57 of each multiaxial hinge 4, and these attaching screws 7, 7 are further screwed into screw holes (not shown) provided on a second casing 3 of the notebook PC 2, so that the second bracket 57 of each multiaxial hinge 4 is attached to the second casing 3.

Figure 2:
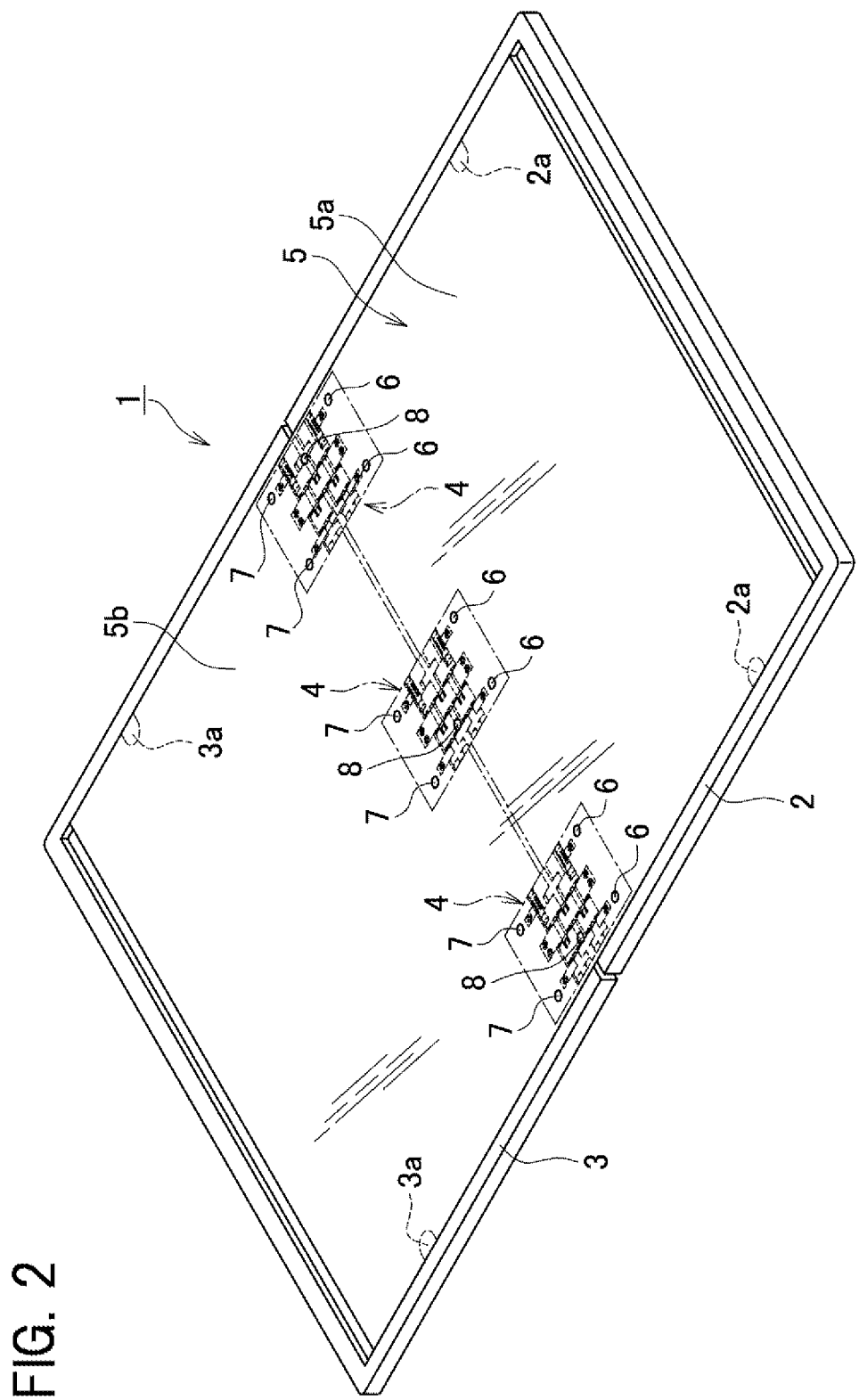
FIG. 2 is a perspective view of a notebook PC as shown in FIG. 1 as seen from top side, while a first casing and a second casing are opened 180 degrees.

In an embodiment as shown in the drawings, as described above, both inner surfaces of the first casing 2 and the second casing 3 are first coupled together via the multiaxial hinges 4, 4, 4, then these inner surfaces are overall covered without interruption by a large-sized, single-piece and touch panel type flexible display sheet 5, such as liquid crystal sheet or organic EL, etc., wherein this display sheet 5 can display images such as videos on its entire surface. Still further, if necessary, an area on the first casing 2 side of the display sheet 5 which displays a keyboard image can be also used as a keyboard surface displaying portion 5a being a touch panel type keyboard. In this case, an area on the second casing 3 side of the display sheet 5 is used as an image displaying portion 5b for documents and images being processed by keyboard input, as is the case for ordinary notebook PCs. In the above-mentioned cases, the large-sized and single-piece flexible display sheet 5 for continuously covering overall the both inner surfaces of the first casing 2 and the second casing 3 are fixed with its central portion onto the three multiaxial hinges 4, 4, 4 using three attaching screws 8, 8, 8 (see FIG. 2). In an embodiment as shown in the drawings, the single-piece flexible display sheet 5 is attached to the first casing 2 and the second casing 3 via the three multiaxial hinges 4, 4, 4 only using the three attaching screws 8, 8, 8 as described above, while the remaining area of the display sheet 5 is not fixed to the first casing 2 and the second casing 3, but just held under a free state on the inner surfaces of the first casing 2 and the second casing 3. In other words, as the first casing 2 and the second casing 3 open and close, the area under the free state of the display sheet 5 can slide along the respective inner surfaces of the first casing 2 and the second casing 3 within a range of some millimeters, so that the display sheet will not roll up partially with a distance from the inner surfaces of the first casing 2 and the second casing 3. In other words, it is conceivable for example, to provide small transparent plastic pressing claws 2a, 2a inward from an edge on the inner surface side of the first casing 2, so that the pressing claws 2a, 2a slightly press the edge of the display sheet 5 in order to prevent the latter from being lifted up, as well as to provide small transparent plastic pressing claws 3a, 3a inward from an edge on the inner surface side of the second casing 3, so that the pressing claws 3a, 3a slightly press the edge of the display sheet 5 in order to prevent the latter from being lifted up, as shown in FIG. 2. However, a holding means for the area under the free state is not limited thereto. For example, groove portions for holding can be also provided inside on the edge of the first casing 2 and the second casing 3, wherein the groove portions are designed to hold circumferential end portions of the display sheet 5, such that the display sheet as a whole is slidable, and to absorb the expansion and the contraction of the display sheet during the opening and closing operation of the first casing 2 and the second casing 3.

Since three multiaxial hinges 4, 4, 4 have an identical structure, reference is made hereinafter to only one of these. In an embodiment as shown in FIGS. 2 to 24, the multiaxial hinge 4 comprises a first main hinge shaft 11 attached on the first casing 2 side via a first bracket 56 and a first attaching member 17 and a second main hinge shaft 12 attached on the second casing 3 side via a second bracket 57 and a second attaching member 18; the multiaxial hinge further comprises a first sub hinge shaft 13 held in parallel to the first main hinge shaft 11 via a plurality of coupling members 23, 27, 31, and a second sub hinge shaft 14 held in parallel to the second main hinge shaft 12 via a plurality of coupling members 24, 28, 32 as well. The first sub hinge shaft 13 and the second sub hinge shaft 14 are designed to be held in parallel to each other by one or a plurality of coupling member(s) 33, 51.

Various kinds of members constituting a rotation controlling means 15 are mounted on a first main hinge shaft 11, a second main hinge shaft 12, a first sub hinge shaft 13 and a second sub hinge shaft 14 as mentioned above, and a gear type synchronous rotation mechanism 16, which transmits a rotation of one of the first main hinge shaft 11 and the second main hinge shaft 12 accompanied by an opening and closing operation of the first casing 2 and the second casing 3 to the other hinge shaft via the first sub hinge shaft 13 and the second sub hinge shaft 14, is provided as a part of the rotation controlling means 15. The rotation controlling means 15 can also include a stopper means and a friction mechanism 36, and additionally a drawing mechanism 39.

Still further, it is characteristic in the multiaxial hinge 4 according to the invention that in order to open and close the first casing 2 and the second casing 3, wherein a flexible and touch-operable display sheet is attached so as to cover both inner surfaces of the both casings, the multiaxial hinges are attached to the respective both end portions of the first casing 2 and the second casing 3, additionally under the display sheet, a plurality of hinge shafts is provided, wherein a first bracket attached to the first casing and a second bracket attached to the second casing are coupled together via a plurality of coupling members, and a synchronous rotation mechanism, a stopper means and a friction mechanism either all in cooperation or each independently from each other are provided on each of the hinge shafts, the multiaxial hinges are designed such that a bent portion is formed on the inner surfaces in a closed state of the first casing and the second casing, and that the first casing and the second casing are flush when the casings are fully opened. Still further, in other embodiment, a synchronous rotation mechanism, a stopper means and a friction mechanism is made to work either all in cooperation or each independently from each other, and the multiaxial hinges are designed such that a bent portion is formed on the inner surfaces in a closed state of the first casing and the second casing, and that the first casing and the second casing are flush when the casings are fully opened. In the following, reference is made to a structure of each of the elements in detail.

Figure 23A:
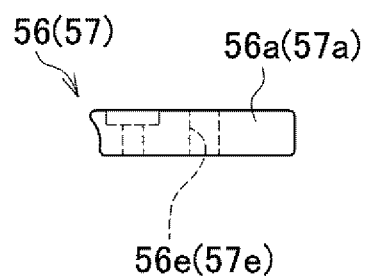
FIGS. 23A and 23B show a first (second) bracket of a multiaxial hinge as shown in FIGS. 5 and 6, FIG. 23A being its plan view and FIG. 23B—its perspective view from below.
Figure 23B:
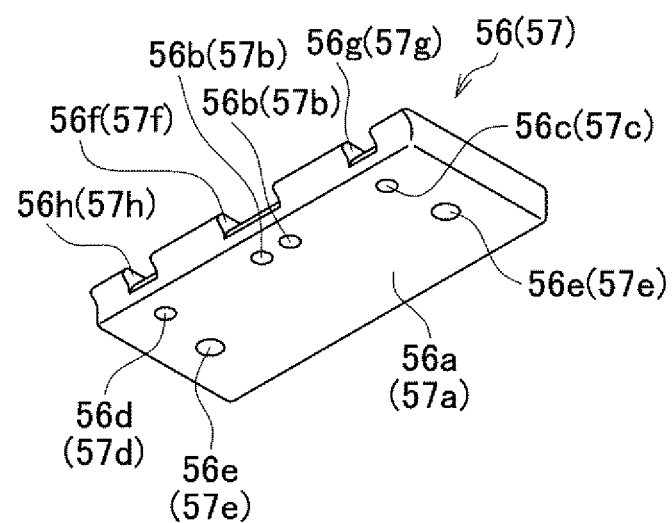

A first bracket 56 attached to a first casing 2 of a notebook PC, etc. and a second bracket 57 attached to a second casing 3 both have an identical structure as shown in FIGS. 3 to 6, 23 (the first bracket 56 is shown in FIG. 23 as a separate piece, and reference numerals for parts of the second bracket 57 corresponding to those of the first bracket are indicated in parentheses; this applies to the following), and comprise respectively a main body portion 56a (57a), fixing screw holes 56b to 56e (57b to 57e) and concave portions 56f to 56h (57f to 57h). As mentioned above, the first bracket 56 (the second bracket 57) is attached to the first casing 2 (the second casing 3) via attaching screws 6, 6 (7, 7) being inserted into its fixing screw holes 56e, 56e (57e, 57e). An arm portion 17e (18e) of a first attaching member 17 (a second attaching member 18) is fitted into the concave portion 56f (57f) of the first bracket 56 (the second bracket 57), and the first attaching member 17 (the second attaching member 18) is fixed to the first bracket 56 (the second bracket 57) by screwing fixing screws 56i, 56i (57i, 57i) (see FIGS. 5, 6) into attaching screw holes 17f, 17g (18f, 18g) provided on the arm portion 17e (18e) and fixing screw holes 56b, 56b (57b, 57b) provided on the first bracket 56 (the second bracket 57). An arm portion 29c (30c) of a first auxiliary attaching member 29 (a second auxiliary attaching member 30) is fitted into the concave portion 56g (57g) of the first bracket 56 (the second bracket 57), and the first auxiliary attaching member 29 (the second auxiliary attaching member 30) is fixed to the first bracket 56 (the second bracket 57) by screwing a fixing screw 56j (57j) (see FIGS. 5, 6) into an attaching screw hole 29d (30d) provided on the arm portion 29c (30c) and a fixing screw hole 56c (57c) provided on the first bracket 56 (the second bracket 57). In the same manner, a spacer 34 (35) is fitted into the concave portion 56h (57h) of the first bracket 56 (the second bracket 57), and the spacer 34 (35) is fixed to the first bracket 56 (the second bracket 57) by screwing a fixing screw 56k (57k) (see FIGS. 5, 6) into an attaching screw hole 34b (35b) provided on the spacer 34 (35) and a fixing screw hole 56d (57d) provided on the first bracket 56 (the second bracket 57). In this manner, the convex portion 56h (57h) is filled up and flattened. In the meantime, the convex portion 56h (57h) with no use is once formed on the first bracket 56 (the second bracket 57), then it is filled up with the spacer 34 (35), in order to reduce the manufacturing costs by shaping the first bracket 56 and the second bracket 57 in an identical shape. In other words, only with the convex portion 56g (57g) for attaching the first auxiliary attaching member 29 (the second auxiliary attaching member 30), the first bracket 56 and the second bracket 57 would become mirror-image symmetric, and would thus need to be separately manufactured. Here, an additional convex portion is formed to avoid an additional cost due to an arrangement without the additional one.

Figure 7A:
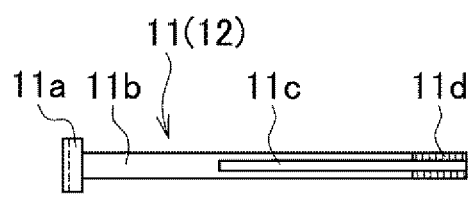
FIGS. 7A and 7B show a first (second) main hinge shaft of a multiaxial hinge as shown in FIGS. 5 and 6, FIG. 7A being its plan view and FIG. 7B—its elevation view.
Figure 7B:
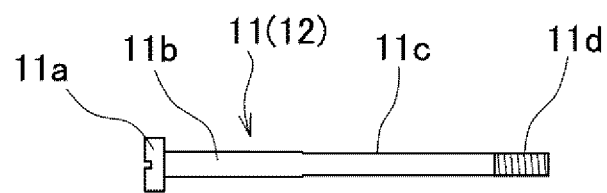
Figure 8:
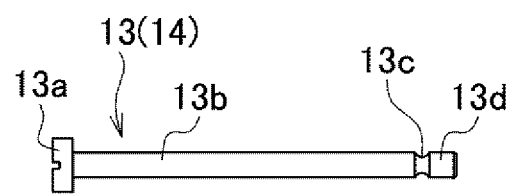
FIG. 8 shows an elevation view of a first (second) sub hinge shaft of a multiaxial hinge as shown in FIGS. 5 and 6.
Figure 9A:
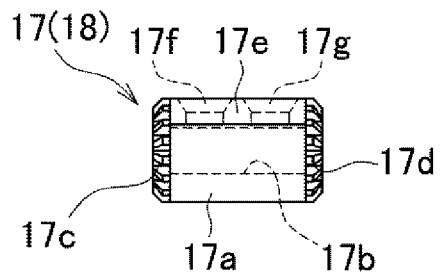
FIGS. 9A to 9D show a first (second) attaching member of a multiaxial hinge as shown in FIGS. 5 and 6, FIG. 9A being its elevation view, FIG. 9B—its left hand side view, FIG. 9C—its plan view and FIG. 9D—its perspective view as seen from below.
Figure 9B:
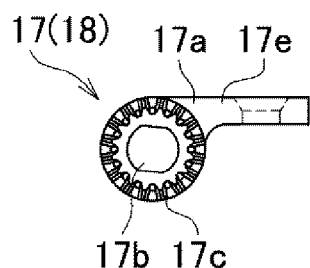
Figure 9C:
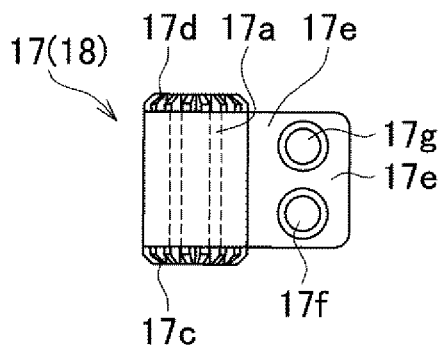
Figure 9D:
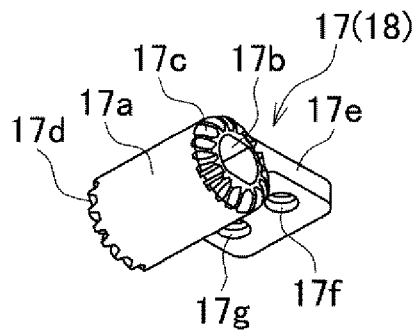
Figure 10A:
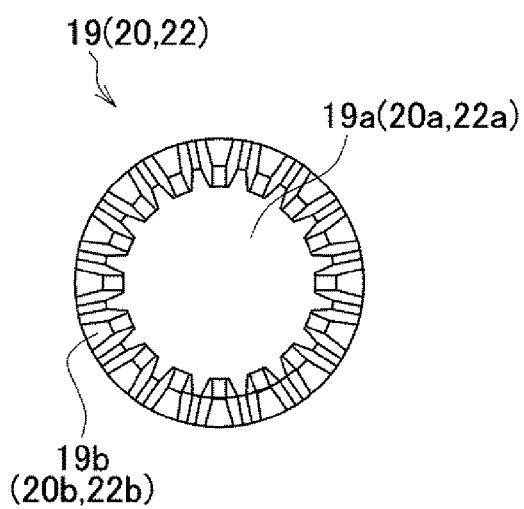
FIGS. 10A and 10B show a first (second) twin-bevel-gear-shaped intermediate gear of a multiaxial hinge as shown in FIGS. 5 and 6, FIG. 10A being its elevation view and FIG. 10B—its side view.
Figure 10B:
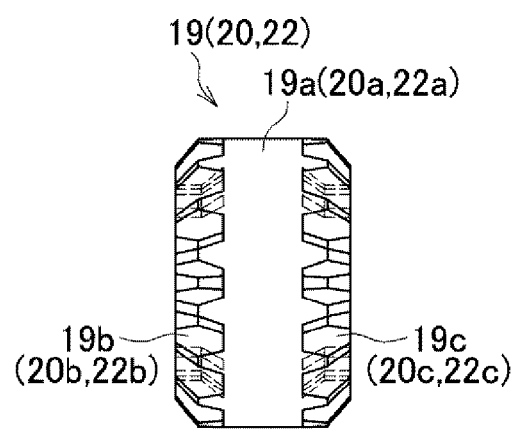
Figure 11A:
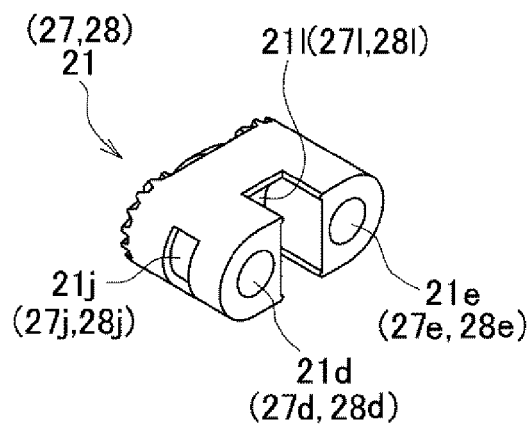
FIGS. 11A to 11D show a rotation block (and coupling member) of a multiaxial hinge as shown in FIGS. 5 and 6, FIG. 11A being its perspective view, FIG. 11B—its elevation view, FIG. 11C—its plan view and FIG. 11D—its left hand side view.
Figure 11B:
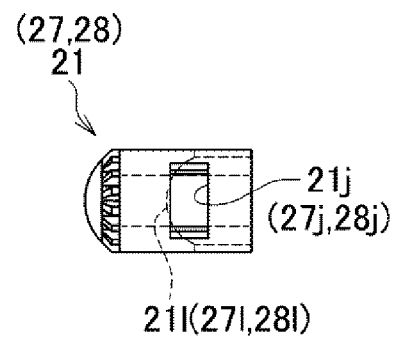
Figure 11C:
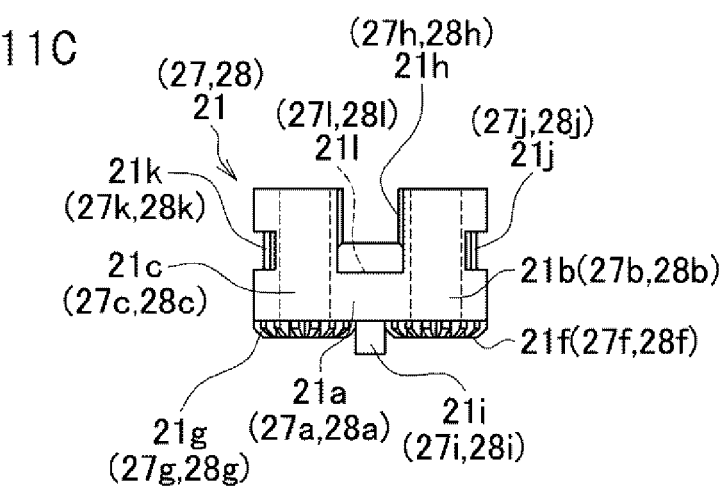
Figure 11D:
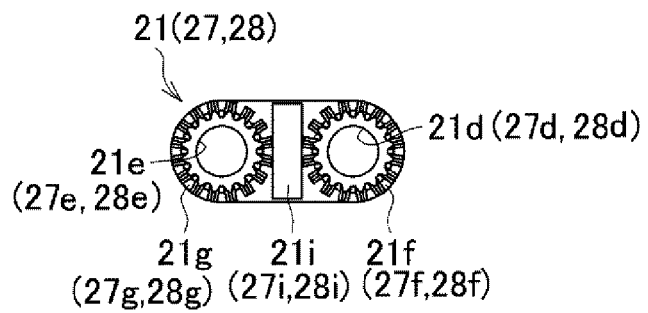
Figure 12A:
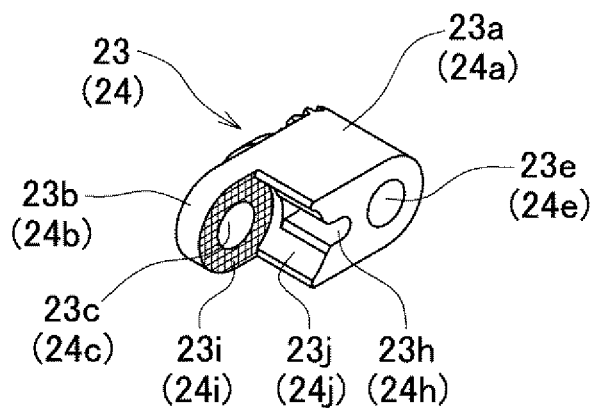
FIGS. 12A to 12D show a different type of coupling member of a multiaxial hinge as shown in FIGS. 5 and 6, FIG. 12A being its perspective view, FIG. 12B—its elevation view, FIG. 12C—its plan view and FIG. 12D—its left hand side view.
Figure 12B:
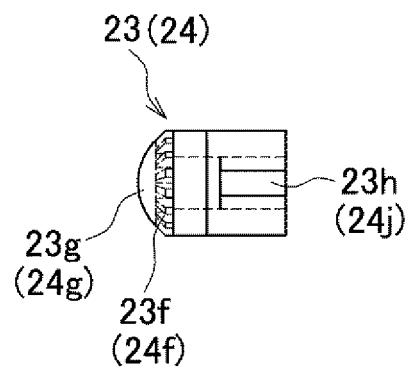
Figure 12C:
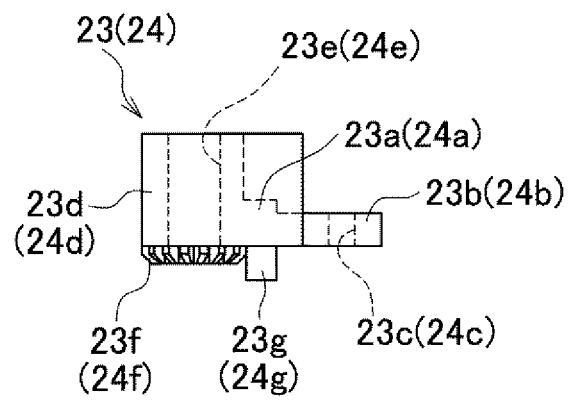
Figure 12D:
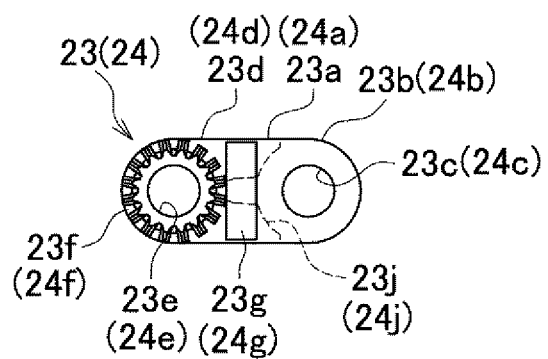
Figure 13A:
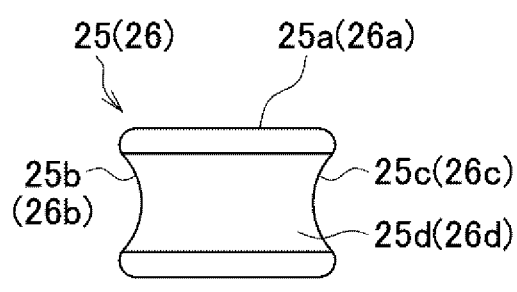
FIGS. 13A to 13C show a spacer of a multiaxial hinge as shown in FIGS. 5 and 6, FIG. 13A being its elevation view, FIG. 13B—its right hand side view and FIG. 13C—its plan view.
Figure 13B:
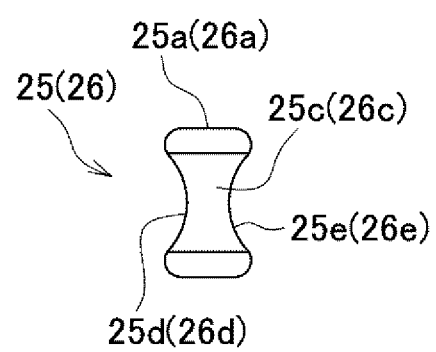
Figure 13C:
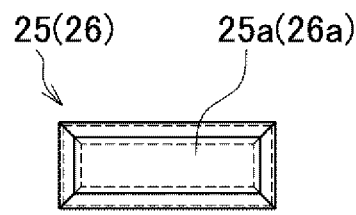
Figure 14:
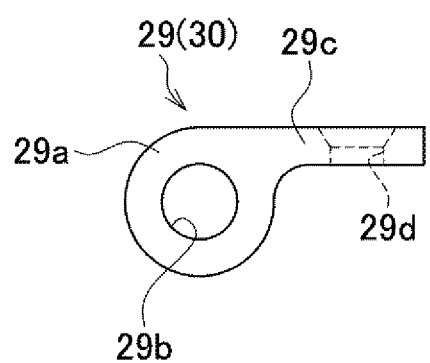
FIG. 14 shows a left hand side view of an auxiliary attaching member of a multiaxial hinge as shown in FIGS. 5 and 6.
Figure 16A:
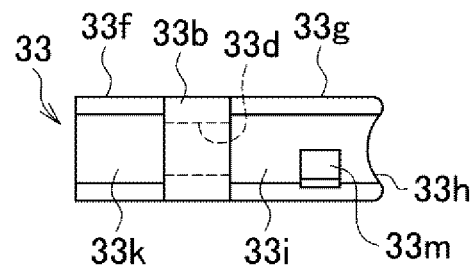
FIGS. 16A to 16D show a further different type of coupling member of a multiaxial hinge as shown in FIGS. 5 and 6, FIG. 16A being its elevation view, FIG. 16B—its plan view, FIG. 16C—its left hand side view and FIG. 16D—its right hand side view.
Figure 16B:
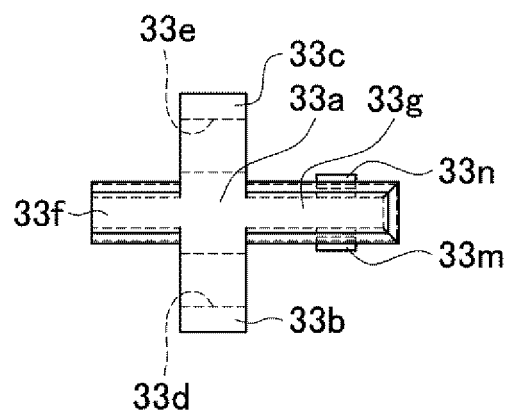
Figure 16C:
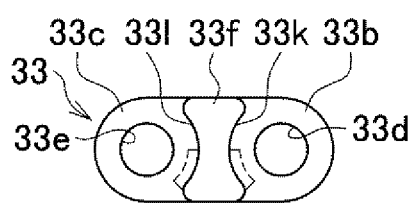
Figure 16D:
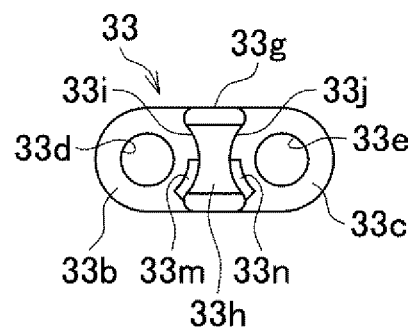
Figure 17A:
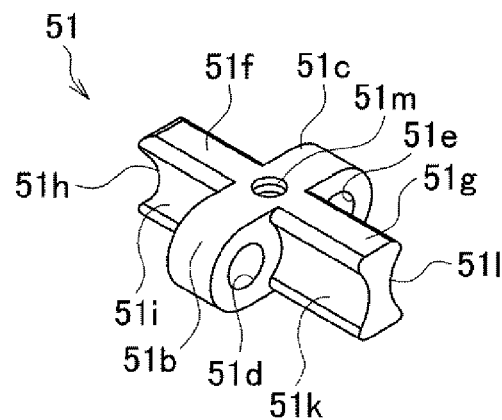
FIGS. 17A to 17D show a further different type of coupling member of a multiaxial hinge as shown in FIGS. 5 and 6, FIG. 17A being perspective view, FIG. 17B being its elevation view, FIG. 17C its plan view and FIG. 17D its left hand side view.
Figure 17B:
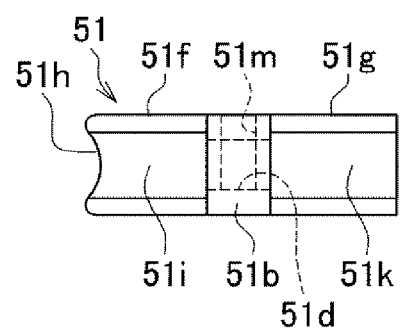
Figure 17C:
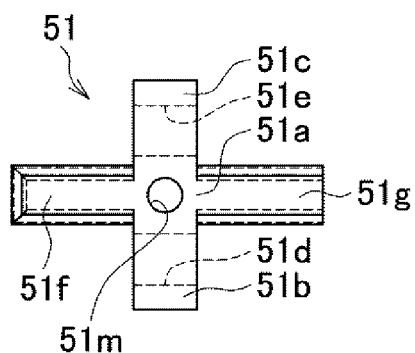
Figure 17D:
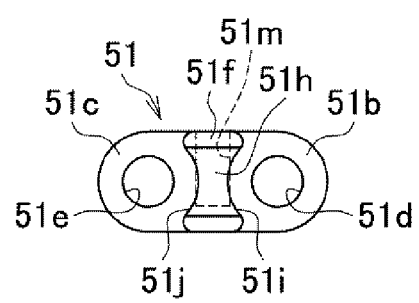

A first main hinge shaft 11 is structured as shown in FIG. 7 (here, the first main hinge shaft 11 is shown as a separate piece, and since a second main hinge shaft 12 has an identical structure, its reference numerals are indicated in parentheses following those for the first main hinge shaft 11), and comprises a head portion 11a (12a), a circular shaft portion 11b (12b), a deformed shaft portion 11c (12c) and a male screw portion 11d (12d).

Figure 3:
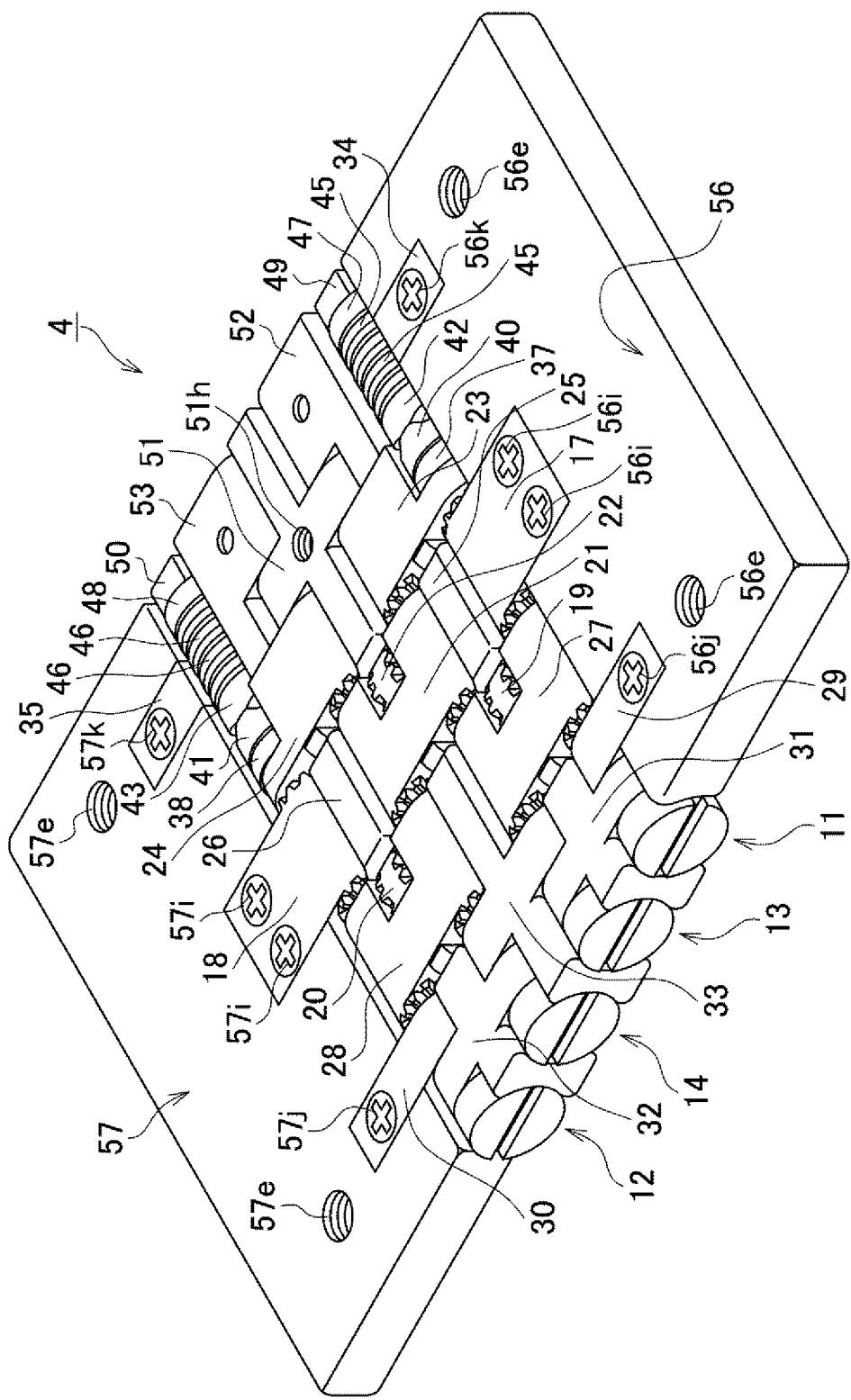
FIG. 3 shows a perspective view of one embodiment of a multiaxial hinge according to the invention, wherein the multiaxial hinge is opened.
Figure 5:
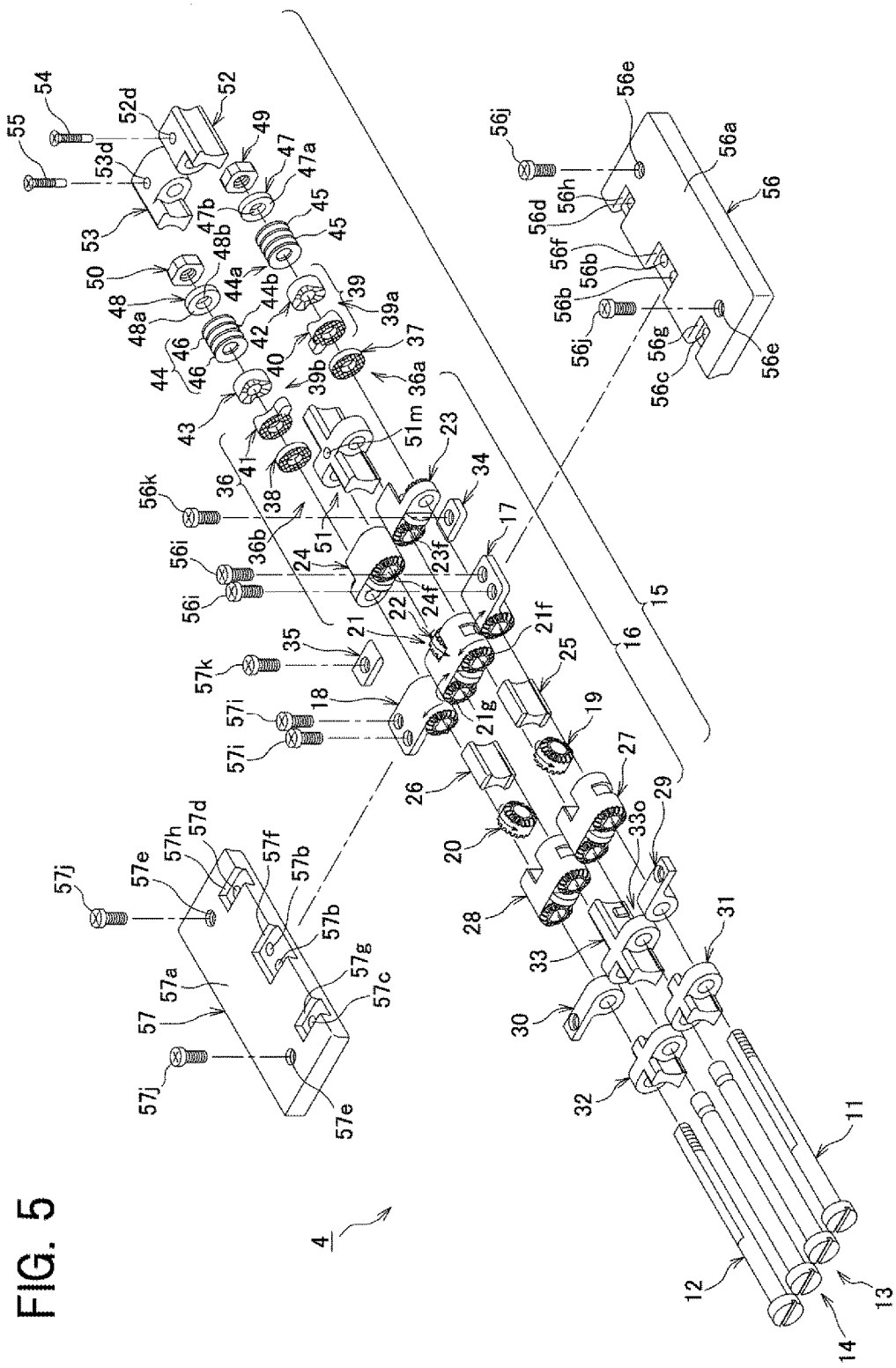
FIG. 5 shows an exploded perspective view of one embodiment of a multiaxial hinge according to the invention.
Figure 6:
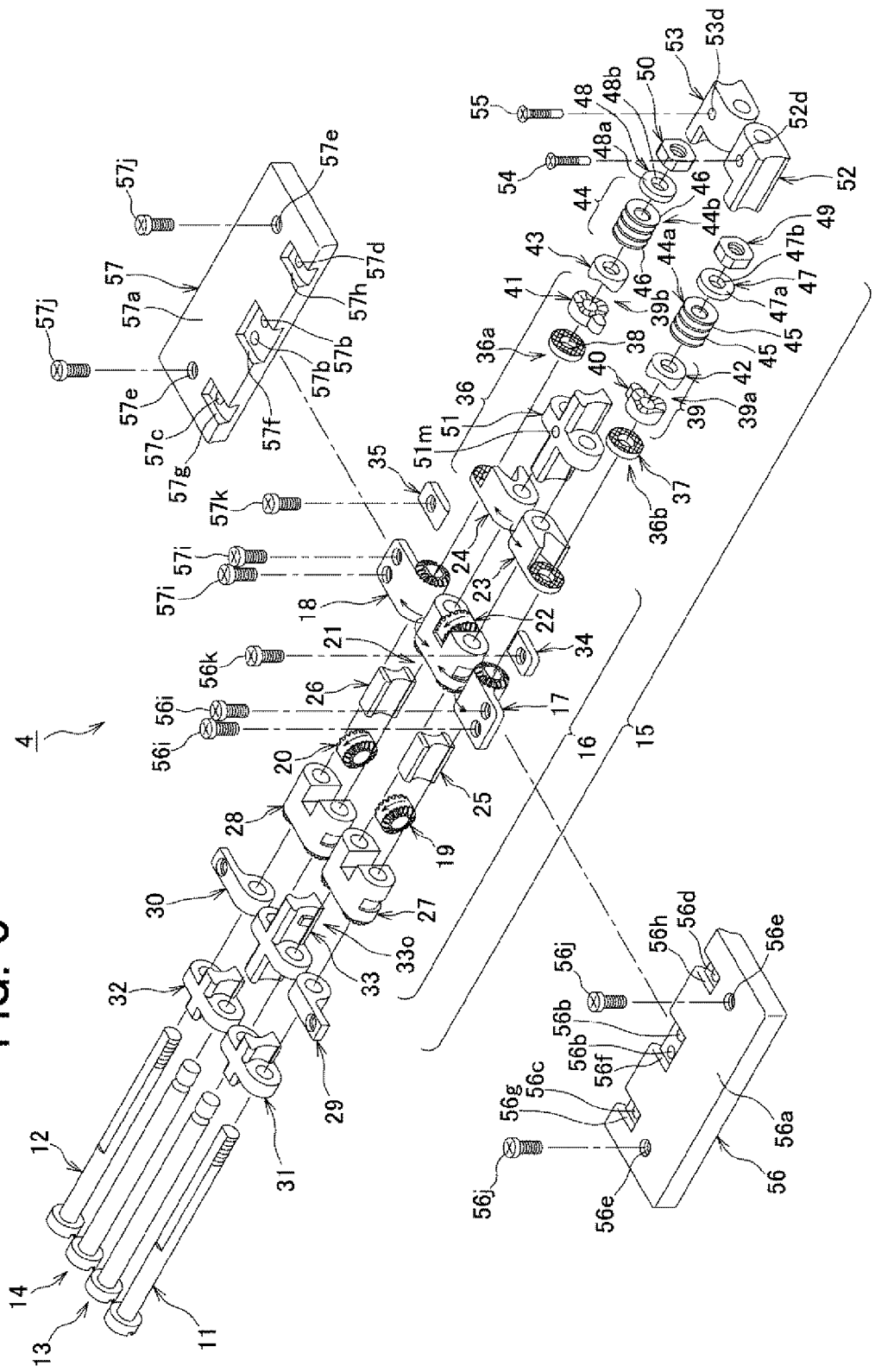
FIG. 6 shows an exploded perspective view of a multiaxial hinge according to the invention as shown in FIG. 5, which is seen from a viewpoint different from FIG. 5.

As shown in FIGS. 3, 5 and 6, a first main hinge shaft 11 (a second main hinge shaft 12) is inserted sequentially through a coupling member 31 (32), a first auxiliary attaching member 29 (a second auxiliary attaching member 30), a different coupling member 27 (28), a first attaching member 17 (18), a further different coupling member 23 (24), a first friction washer 37 (38), a first cam disc 40 (41), a first cam follower 42 (43), disc springs 45, 45 (46, 46) of a first elastic means 44a (44b) and a washer 47 (48); then, a clamping nut 49 (50) is screwed onto a male screw portion 11d (12d) on its tip. In this manner, components as mentioned above are mounted to a shaft portion of the first main hinge shaft 11 (the second main hinge shaft 12). In this case, the circular shaft portion 11b (12b) of the first main hinge shaft 11 (the second main hinge shaft 12) is inserted through a first circular shaft hole 31d (32d) (see FIG. 15) of the coupling member 31 (32), a circular shaft hole 29b (30b) (see FIG. 14) of a first auxiliary attaching member 29 (a second auxiliary attaching member 30), a first circular shaft hole 27d (28d) (see FIG. 11) of a coupling member 27 (28) and a first circular shaft hole 23c (24c) (see FIG. 12) of a coupling member 23 (24), so that the elements as mentioned above are mounted so as to be rotatable around the shaft. A first attaching member 17 (18), a coupling member 23 (24), a first friction washer 37 (38), a first cam disc 40 (41), a first cam follower 42 (43), disc springs 45, 45 (46, 46) and a washer 47 (48) are mounted to a deformed shaft portion 11c (12c) of the first main hinge shaft 11 (the second main hinge shaft 12). In this case, a deformed shaft portion 11c (12c) of the first main hinge shaft 11 (the second main hinge shaft 12) is inserted through a deformed shaft hole 17b (18b) (see FIG. 9) of the first attaching member 17 (the second attaching member 18), a deformed shaft hole 37b (38b) (see FIG. 18) of the first friction washer 37 (38), a deformed shaft hole 42b (43b) (see FIG. 20) of the first cam follower 42 (43) and a deformed shaft hole 47b (48b) (see FIG. 5, 6) of the washer 47 (48), and the elements as mentioned above are mounted with a rotation of the deformed shaft portion 11c (12c) of the first main hinge shaft 11 (12) around the shaft being restrained.

As shown in FIGS. 3, 5 and 6, a first sub hinge shaft 13 (a second sub hinge shaft 14) comprises a circular shaft portion 13b (14b), which is sequentially inserted through a first circular shaft hole 31e (a second circular shaft hole 32e) (see FIG. 15) of a coupling member 31 (32), a first circular shaft hole 33c (a second circular shaft hole 33e) (see FIG. 16) of a different coupling member 33, a first circular shaft hole 27e (a second circular shaft hole 28e) (see FIG. 11) of a further different coupling member 27 (28), a first circular shaft hole 21d (a second circular shaft hole 21e) of a rotating block 21, a second circular shaft hole 23c (second circular shaft hole 24e) (see FIG. 12) of a further different coupling member 23 (24) and a first circular shaft hole 51c (second circular shaft hole 51e) (see FIG. 17) of a further different coupling member 51. Then, a tip-side circular shaft portion 13d (14d) of the first sub hinge shaft 13 (a second sub hinge shaft 14) is inserted into a circular shaft hole 52c (53c) of a first shaft end attaching member 52 (a second shaft end attaching member 53) (see FIG. 21), and locking screw 54

(55) is screwed into a screw hole 52d (53d) of the first shaft end attaching member 52 (a second shaft end attaching member 53). In this manner, a side surface of the locking screw 54 (55) engages with a locking screw locking groove 13c (14c) of the first sub hinge shaft 13 (the second sub hinge shaft 14), and the respective elements are mounted onto the shaft of the first sub hinge shaft 13 (the second sub hinge shaft 14) without escaping from it. In the meantime, since a shaft portion of the first sub hinge shaft 13 (the second sub hinge shaft 14) is only the circular shaft portion 13b (14b), the respective elements as mounted to the shaft portion are all held so as to be rotatable without the rotation thereof being restrained.

In a process as described above, in which the respective elements as mentioned above are mounted onto a shaft of a first main hinge shaft 11 (a second main hinge shaft 12) and the one of a first sub hinge shaft 13 (a second sub hinge shaft 14), a first twin-bevel-gear-shaped intermediate gear 19 (a second twin-bevel-gear-shaped intermediate gear 20) is rotatably housed into an intermediate gear housing concave portion 27h (28h) of a coupling member 27 (28) (see FIGS. 5, 6), and a spacer 25 (26) is held so as to be situated between an outer circumferential surface of the first twin-bevel-gear-shaped intermediate gear 19 (the second twin-bevel-gear-shaped intermediate gear 20) and an engaging concave portion 23g (24g) of the coupling member 23 (24). Still further, a third twin-bevel-gear-shaped intermediate gear 22 is rotatably housed into an intermediate gear housing concave portion 21h of a rotating block 21, and an outer circumferential surface of the third twin-bevel-gear-shaped intermediate gear 22 is held between the rotating block and an abutting concave portion 51g of the coupling member 51. In this manner, a first twin-bevel-gear-shaped intermediate gear 19 (a second twin-bevel-gear-shaped intermediate gear 20), a third twin-bevel-gear-shaped intermediate gear 22 and a spacer 25 (26) are not directly mounted onto the shaft of the first main hinge shaft 11 (the second main hinge shaft 12) and the one of the first sub hinge shaft 13 (the second sub hinge shaft 14), but indirectly held via other elements.

Figure 4:
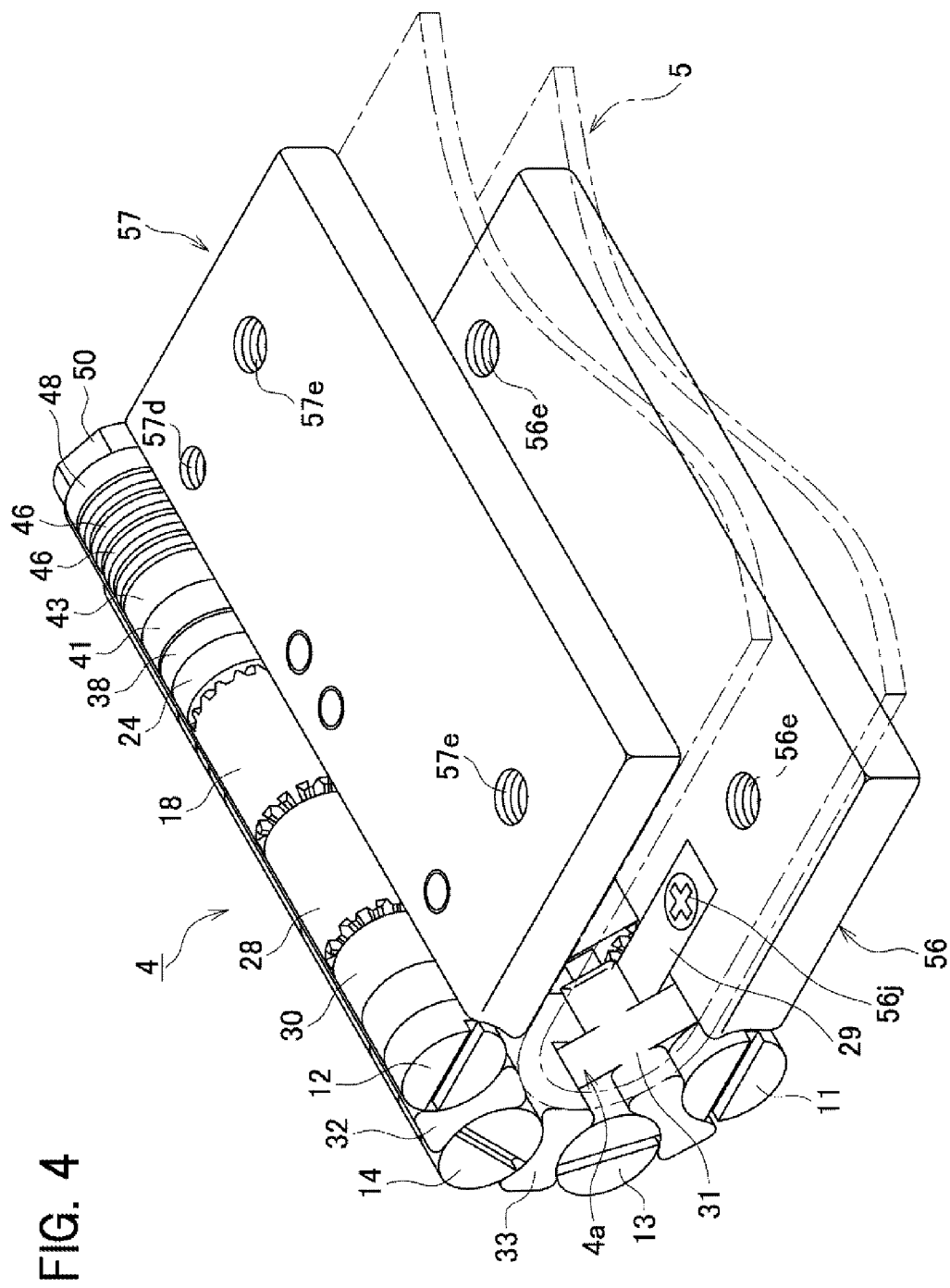
FIG. 4 shows a perspective view of a flexible display sheet attached to a multiaxial hinge as shown in FIG. 3, wherein the multiaxial hinge is closed.

Using a multiaxial hinge 4 according to the invention assembled as described above, a first casing 2 and a second casing 3 in their fully opened state have flat inner surfaces altogether in appearance as shown in FIG. 3, and flush inner surfaces of the first casing 2 and the second casing 3 are formed, as shown in FIG. 2. Still further, a bent portion 4a is formed in its inside as shown in FIG. 4, and regulated such that its curvature is a predetermined value or less.

In the following, reference is made to various parts of multiaxial hinge 4 according to the invention composed of elements as described above. As shown in FIGS. 5 and 6, the multiaxial hinge 4 according to the invention comprises a rotation controlling means 15, and the rotation controlling means 15 comprises a synchronous rotation mechanism 16, a stopper means 33o, a friction mechanism 36, a drawing mechanism 39.

Of those mentioned above, the synchronous rotation mechanism 16 is a gear type mechanism, and comprises as its main components a first attaching member 17 and a second attaching member 18 respectively attached to a first main hinge shaft 11 and a second main hinge shaft 12, with their respective rotation being restrained, a rotating block 21 through which a first sub hinge shaft 13 and a sub main hinge shaft 14 are respectively rotatably inserted, a first twin-bevel-gear-shaped intermediate gear 19 for transmitting a rotation of the first attaching member 17 to the rotating block 21, and a second twin-bevel-gear-shaped intermediate gear 20 for transmitting a rotation of the second attaching member 18 to the rotating block 21. Furthermore, the synchronous rotation mechanism comprises a third twin-bevel-gear-shaped intermediate gear 22 rotatably mounted to the rotating block 21 and a coupling member 23 (24) through which the first main hinge shaft 11 (the second main hinge shaft 12) and the first sub hinge shaft 13 (the sub main hinge shaft 14) are rotatably inserted and which comprises a bevel-gear-shaped gear meshed with the third twin-bevel-gear-shaped intermediate gear 22.

A first attaching member 17 and a second attaching member 18 (since both have an identical structure, reference is exclusively made to the first attaching member 17, and reference numerals for components of the second attaching member 18 are added in parentheses following those for the first attaching member 17, so redundant explanations are omitted; see FIGS. 5, 6 and 9; this also applies to other elements) respectively comprise a cylindrical main body portion 17a (18a), a deformed shaft hole 17b (18b), bevel gear-shaped drive gears 17c, 17d (18c, 18d), an arm portion 17e (18e), and attaching screw holes 17f, 17g (18f, 18g); a deformed shaft portion 11c (12c) of a first main hinge shaft 11 (12) is inserted through its deformed shaft hole 17b (18b), so that the first main hinge shaft 11 (12) rotates together with a rotation of a first bracket 56 (57). The bevel gear-shaped drive gears 17c, 17d (18c, 18d) having the first main hinge shaft 11 (12) as central axis are formed on a shaft end surface of the cylindrical main body portion 17a (18a) of the first attaching member 17 (18). Of these, the bevel gear-shaped drive gear 17c (18c) meshes with a bevel gear-shaped driven gear 19b (20b) of a first twin-bevel-gear-shaped intermediate gear 19 (20) as described below. Another bevel gear-shaped drive gear 17d (18d) of the first attaching member 17 (18) is simply provided in order to reduce the manufacturing cost, that is, to make the first attaching member 17 and the second attaching member 18 in an entirely identical shape and size, and thus allow such elements to serve as both of the attaching members. Thus, this bevel gear-shaped drive gear has no counterpart gear to mesh with this in an assembled state as shown in the drawings.

As shown in FIGS. 5, 6 and 11, a rotating block 21 comprises a main body portion 21a, a first cylindrical shaft portion 21b, a second cylindrical shaft portion 21c, a first circular shaft hole 21d, a second circular shaft hole 21e, a first bevel-gear-shaped driven gear 21f, a second bevel-gear-shaped driven gear 21g, an intermediate gear housing concave portion 21h, a coupling member locking convex portion 21i, stopper concave portions 21j, 21k, an intermediate gear housing concave surface 21l; a first sub hinge shaft 13 is rotatably inserted through its first circular shaft hole 21d, and a second sub hinge shaft 14 is rotatably inserted through its second circular shaft hole 21e. The first bevel-gear-shaped driven gear 21f of the rotating block 21 meshes with a bevel gear-shaped driven gear 19b of a first twin-bevel-gear-shaped intermediate gear 19 (see FIGS. 3, 5, 6 and 10) as described below, and the second bevel-gear-shaped driven gear 21g of the rotating block 21 meshes with a bevel-gear-shaped driven gear 20b of a second twin-bevel-gear-shaped intermediate gear 20 (see FIG. 3, etc.). A third twin-bevel-gear-shaped intermediate gear 22 (see FIGS. 5, 6 and 10) as described below is rotatably housed into a space formed by the intermediate gear housing concave portion 21h and the intermediate gear housing concave surface 21l of the rotating block 21, and the coupling member locking convex portion 21i abuts against and engages with an arc-shaped concave portion 33n of a coupling member 33 as described below. In the meantime, the stopper concave portions 21j, 21k of the rotating block 21 are merely components required as long as they are used as coupling members 27, 28 as described below, which are manufactured to have an identical shape and an identical size and used as such; as long as the element as a whole is used as the rotating block 21, the stopper concave portions do not have a special function. In other words, stopper concave portions 27j, 27k (28j, 28k) of a coupling member 27 (28) are intended to work together with stopper convex portions 33m, 33n of the coupling member 33 as described below in order to generate a stopper function for regulating a rotation angle of the coupling members 27, 28 within a predetermined range; as long as the stopper concave portions are used for the rotating block 21, they do not have a special function.

A first twin-bevel-gear-shaped intermediate gear 19 (a second twin-bevel-gear-shaped intermediate gear 20) comprises a disc-shaped main body portion 19a (20a), bevel-gear-shaped driven gears 19b, 19c (20b, 20c); it is intended to transmit a rotation of a bevel-gear-shaped drive gear 17c (18c) of a first attaching member 17 (18) as described above to a first bevel-gear-shaped driven gear 21f (a second bevel-gear-shaped driven gear 21g) of a rotating block 21 as described above. The disc-shaped main body portion 19a (20a) of the first twin-bevel-gear-shaped intermediate gear 19 (the second twin-bevel-gear-shaped intermediate gear 20) is rotatably housed into a space formed by an intermediate gear housing concave portion 27h (28h) and an intermediate gear housing concave surface 27l (28l) of a coupling member 27 (28). In this case, the first twin-bevel-gear-shaped intermediate gear 19 (the second twin-bevel-gear-shaped intermediate gear 20) is rotatably held around an axis perpendicular to a first main hinge shaft 11 (12). This also applies to an attached state of a third twin-bevel-gear-shaped intermediate gear 22 to a rotating block 21 as described above. In order to prevent a first twin-bevel-gear-shaped intermediate gear 19 (a second twin-bevel-gear-shaped intermediate gear 20) as housed in an intermediate gear housing concave portion 27h (28h) of a coupling member 27 (28) from escaping and backlash, as well as to fill the gap formed around an outer circumferential surface of the first twin-bevel-gear-shaped intermediate gear 19 (the second twin-bevel-gear-shaped intermediate gear 20), the first twin-bevel-gear-shaped intermediate gear 19 (the second twin-bevel-gear-shaped intermediate gear 20) is rotatably held at a certain position, with a spacer being in slidable contact with a part of the outer circumferential surface of the first twin-bevel-gear-shaped intermediate gear 19 (the second twin-bevel-gear-shaped intermediate gear 20). One bevel-gear-shaped driven gears 19b (20b) of the first twin-bevel-gear-shaped intermediate gear 19 (the second twin-bevel-gear-shaped intermediate gear 20) is meshed with the bevel-gear-shaped drive gear 17c (18c) of a first attaching member 17 (18) as described above, and other bevel-gear-shaped driven gears 19c (20c) of the first twin-bevel-gear-shaped intermediate gear 19 (the second twin-bevel-gear-shaped intermediate gear 20) is meshed with the first bevel-gear-shaped driven gear 21f (a second bevel-gear-shaped driven gear 21g) of a rotating block 21 as described above.

In case of the present embodiment, a coupling member 27 (28) is a component manufactured in a shape and a size identical to a rotating block 21 as described above, and as shown in drawings (see FIGS. 5, 6 and 11), comprises a main body portion 27a (28a), a first cylindrical shaft portion 27b (28b), a second cylindrical shaft portion 27c (28c), a first circular shaft hole 27d (28d), a second circular shaft hole 27e (28e), a first bevel-gear-shaped driven gear 27f (28f), a second bevel-gear-shaped driven gear 27g (28g), an intermediate gear housing concave portion 27h (28h), a coupling member locking convex portion 27i (28i), stopper concave portions 27j, 27k (28j, 28k), and an intermediate gear housing concave surface 27l (28l); a first main hinge shaft 11 (12) is rotatably inserted through its first circular shaft hole 27d (28d), and a first sub hinge shaft 13 is rotatably inserted through its second circular shaft hole 27e (28e). As described above, the first twin-bevel-gear-shaped intermediate gear 19 (the second twin-bevel-gear-shaped intermediate gear 20) is rotatably housed into the intermediate gear housing concave portion 27h (28h) of the coupling member 27 (28). A stopper convex portion 33m (33n) of a coupling member 33 as described below is fitted into a stopper concave portion 27k (28k) provided on an outer circumferential surface of the second cylindrical shaft portion 27c (28c) of the coupling member 27 (28), and with one engaging another (see FIG. 25), a stopper means 33o as described below is formed. The coupling member locking convex portion 27i (28i) of the coupling member 27 (28) is housed into an arc-shaped concave portion 31h (32h) of a coupling member 31 (32). A first bevel-gear-shaped driven gear 27f (28f) and a second bevel-gear-shaped driven gear 27g (28g) of the coupling member 27 (28) do not have a special function in an assembled state as shown in the drawings.

A spacer 25 (26) comprises arc-shaped concave portions 25b, 25c (26b, 26c) on both ends of its main body portion 25a (26a), as well as arc-shaped concave portions 25d, 25e (26d, 26e) on both side portions. An arc-shaped concave portion 25b (26b) on one end is in slide contact with an outer circumferential surface of the first twin-bevel-gear-shaped intermediate gear 19 (the second twin-bevel-gear-shaped intermediate gear 20), and an arc-shaped concave portion 25c (26c) on other end is provided, while it abuts against a spacer locking concave portion 23g (24g) of a coupling member 23 (24) as described below. Furthermore, an arc-shaped concave portions 25d (26d) on one side portion of the spacer 25 (26) abuts against an outer circumferential surface of a cylindrical main body portion 17a (18a) of the first attaching member 17 (18), and an arc-shaped concave portions 25e (26e) on other side portion is provided, while it abuts against an outer circumferential surface of a first cylindrical shaft portion 21b (21c) of a rotating block 21 as described above.

Therefore, a first twin-bevel-gear-shaped intermediate gear 19 (a second twin-bevel-gear-shaped intermediate gear 20) and a spacer 25 (26) are not directly attached to a first main hinge shaft 11 (a second main hinge shaft 12), a first sub hinge shaft 13 (a second sub hinge shaft 14) and a first bracket 56 (a second bracket 57), etc., but pivotally supported by other elements directly attached to the first main hinge shaft 11 (the second main hinge shaft 12), etc. This is the difference from the cases of these other elements.

A coupling member 33 (see FIGS. 5, 6 and 16) comprises a main body portion 33a, a first ring-shaped shaft portion 33b, a second ring-shaped shaft portion 33c, a first circular shaft hole 33d, a second circular shaft hole 33e, a first partition 33f, a second partition 33g, arc-shaped concave portions 33h to 33l, and stopper convex portions 33m, 33n; a first sub hinge shaft 13 is rotatably inserted through its first circular shaft hole 33d, and a second sub hinge shaft 14 is rotatably inserted through its second circular shaft hole 33e. As described above, the stopper convex portions 33m, 33n are fitted into stopper concave portions 27j, 27k (28j, 28k) provided on a coupling member 27 (28), in order to regulate the rotation angle of the coupling member 27 (28). An arc-shaped concave portion 33h provided on a tip of the coupling member 33 is fitted with a coupling member locking convex portion 21i of a rotating block 21 as described above. An arc-shaped concave portion 33*i* of the coupling member 33 is in slide contact with an outer circumferential surface of a second cylindrical shaft portion 27*c* of a coupling member 27, while an arc-shaped concave portion 33*j* with an outer circumferential surface of a second cylindrical shaft portion 28*c* of the coupling member 28, an arc-shaped concave portion 33*k* with an outer circumferential surface of a second ring-shaped shaft portion 31*c* of a coupling member 31 and an outer circumferential surface of a head portion 13*a* of a first sub hinge shaft 13, and an arc-shaped concave portion 33*l* with an outer circumferential surface of a second ring-shaped shaft portion 32*c* of a coupling member 32 and an outer circumferential surface of a head portion 14*a* of a second sub hinge shaft 14; in this manner, gaps formed between top surfaces of these components can be reduced.

A first auxiliary attaching member 29 (a second auxiliary attaching member 30) (see FIGS. 5, 6 and 14) comprises a cylindrical main body portion 29*a* (30*a*), a circular shaft hole 29*b* (30*b*) an arm portion 29*c* (30*c*) and an attaching screw hole 29*d* (30*d*); it is fixed to a first bracket 56 (a second bracket 57) by an attaching screw (not shown in the drawings) screwed into its attaching screw hole 29*c* (30*c*) and a fixing screw holes 56*e* (57*e*) of the first bracket 56 (the second bracket 57), and a first main hinge shaft 11 (a second main hinge shaft 12) is rotatably inserted into its circular shaft hole 29*b* (30*b*).

A coupling member 31 (32) (see FIGS. 5, 6 and 15) comprises a main body portion 31*a* (32*a*), a first ring-shaped shaft portion 31*b* (32*b*), a second ring-shaped shaft portion 31*c* (32*c*), a first circular shaft hole 31*d* (32*d*), a second circular shaft hole 31*e* (32*e*), a first partition 31*f* (32*f*), a second partition 31*g* (32*g*), arc-shaped concave portions 31*h* to 31*l* (32*h* to 32*l*); a first main hinge shaft 11 (12) is rotatably inserted through its first circular shaft hole 31*d* (32*d*), and a first sub hinge shaft 13 (14) is rotatably inserted through its second circular shaft hole 31*e* (32*e*). An arc-shaped concave portion 31*h* (32*h*) provided on a tip of the coupling member 31 (32) abuts against a coupling member locking convex portion 27*i* (28*i*) of a coupling member 27 (28) as described above. An arc-shaped concave portion 31*i* (32*i*) of the coupling member 31 (32) is in slide contact with an outer circumferential surface of a cylindrical main body portion 29*a* (30*a*) of a first auxiliary attaching member 29 (a second auxiliary attaching member 30) as described above, while an arc-shaped concave portion 31*j* (32*j*) with an outer circumferential surface of a first ring-shaped shaft portion 33*b* (33*c*) of the coupling member 33, and an arc-shaped concave portion 31*k* (32*k*) with an outer circumferential surface of a head portion 11*a* (12*a*) of a first main hinge shaft 11 (12); in this manner, gaps formed between top surfaces of these components can be reduced.

A coupling member 23 (24) (see FIGS. 5, 6 and 12) comprises a main body portion 23*a* (24*a*), an arc-shaped shaft portion 23*b* (24*b*), a first circular shaft hole 23*c* (24*c*), a cylindrical shaft portion 23*d* (24*d*), a second circular shaft hole 23*e* (24*e*), a bevel-gear-shaped gear 23*f* (24*f*), a spacer locking concave portion 23*g* (24*g*), a key groove 23*h* (24*h*), a waffle-knurl pattern 23*i* (24*i*), a cylindrical concave portion 23*i* (24*j*); a first main hinge shaft 11 (a second main hinge shaft 12) is rotatably inserted through its first circular shaft hole 23*d* (24*d*), and a first sub hinge shaft 13 (a second sub hinge shaft 14) is rotatably inserted through its second circular shaft hole 23*e* (24*e*). The bevel-gear-shaped gear 23*f* (24*f*) provided on one shaft end surface of the cylindrical shaft portion 23*d* (24*d*) of the coupling member 23 (24) is respectively meshed with a bevel-gear-shaped driven gear 22*b* (22*c*) of a third twin-bevel-gear-shaped intermediate gear 22 (see FIGS. 5, 6 and 10) mounted to a rotating block 21 as described above. As described above, the spacer locking concave portion 23*g* (24*g*) provided on the coupling member 23 (24) abuts against an arc-shaped concave portion 25*b* (26*b*) of a spacer 25 (26). A waffle-knurl pattern 23*i* (24*i*) is formed on a back surface of the arc-shaped shaft portion 23*b* (24*b*) of the coupling member 23 (24) in order to enhance a friction effect of a first friction washer 37 (a second friction washer 38) as described below. Furthermore, the key groove 23*h* (24*h*) is formed on the cylindrical concave portion 23*i* (24*j*) adjacent to the cylindrical shaft portion 23*d* (24*d*) of the coupling member 23 (24), and a detent key 40*l* of a first cam disc 40 (a second cam disc 41) as described below as well as a detent convex portion 52*g* (53*g*) of a first shaft end attaching member 52 (a second shaft end attaching member 53) as described below. As described below, the coupling member 23 (24) and a third twin-bevel-gear-shaped intermediate gear 22 as described above play a role in realizing a part of synchronous rotation movement of a synchronous rotation mechanism 16.

Next, a coupling member 51 (see FIGS. 5, 6 and 17) also functions as spacer and comprises a main body portion 51*a*, a first ring-shaped shaft portion 51*b*, a second ring-shaped shaft portion 51*c*, a first circular shaft hole 51*d*, a second circular shaft hole 51*e*, a first partition 51*f*, a second partition 51*g*, arc-shaped concave portions 51*h* to 51*l*, and a display sheet fixing screw hole 51*m*; a first sub hinge shaft 13 is rotatably inserted through its first circular shaft hole 51*d*, and a second sub hinge shaft 14 is rotatably inserted through its second circular shaft hole 51*e*. An arc-shaped concave portion 51*h* provided on a tip of the first partition 51*f* of the coupling member 51 is fitted with an outer circumferential surface of a third twin-bevel-gear-shaped intermediate gear 22 as described above, which is housed in an intermediate gear housing concave portion 21*h* of a rotating block 21 as described above. An arc-shaped concave portion 51*i* of the coupling member 51 is in slide contact with an outer circumferential surface of a cylindrical shaft portion 23*d* of a coupling member 23, while an arc-shaped concave portion 51*j* with an outer circumferential surface of a cylindrical shaft portion 24*d* of the coupling member 24, an arc-shaped concave portion 51*k* with an outer circumferential surface of a cylindrical shaft portion 52*b* of a first shaft end attaching member 52, and an arc-shaped concave portion 51*l* with an outer circumferential surface of a cylindrical shaft portion 53*b* of a second shaft end attaching member 53; in this manner, gaps formed between top surfaces of these components can be reduced. In the meantime, a display sheet fixing screw hole 51*m* is intended to attach a display sheet 5 (see FIG. 2) to a multiaxial hinge 4 using an attaching screw 8.

A first shaft end attaching member 52 (see FIGS. 5, 6, 21) (a second shaft end attaching member 53) comprises a main body portion 52*a* (53*a*), cylindrical shaft portion 52*b* (53*b*), a circular shaft hole 52*c* (53*c*), arc-shaped concave portions 52*e* to 52*f* (53*e* to 53*f*) and a detent convex portion 52*g* (53*g*), and it is attached to a tip-side circular shaft portion 13*d* (14*d*) of a first sub hinge shaft 13 (a second sub hinge shaft 14), as described above; therefore, explanations more or less the same as what is described above is omitted. The detent convex portion 52*g* (53*g*) is fitted into a key groove 23*h* (24*h*) as described above of a coupling member 23 (24) as described above, and rotates on the first sub hinge shaft 13 (the second sub hinge shaft 14), with being coupled to the coupling member 23 (24).

Figure 18:
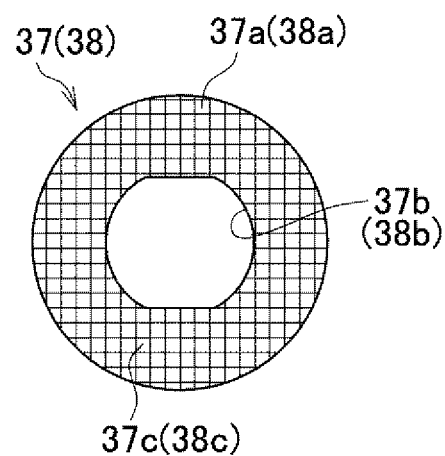
FIG. 18 shows a left hand side view of a first (second) friction washer of a multiaxial hinge as shown in FIGS. 5 and 6.
Figure 19A:
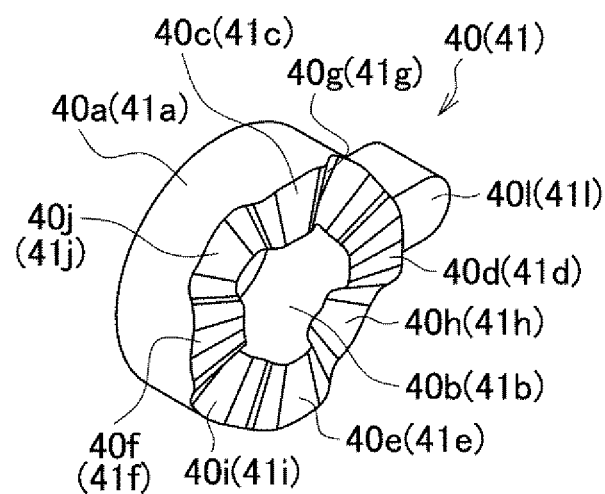
FIGS. 19A to 19C show a first (second) cam disc of a multiaxial hinge as shown in FIGS. 5 and 6, FIG. 19A being its perspective view, FIG. 19B—its elevation view and FIG. 19C—its left hand side view.
Figure 19C:
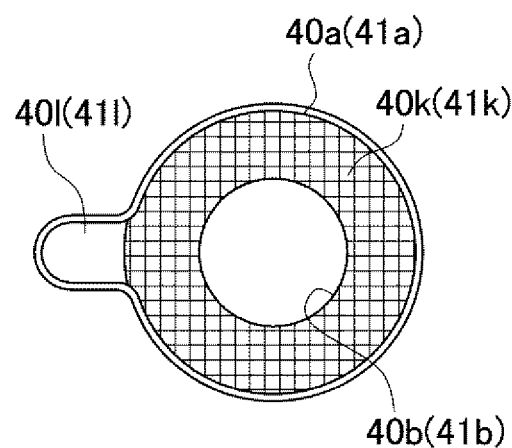
Figure 19B:
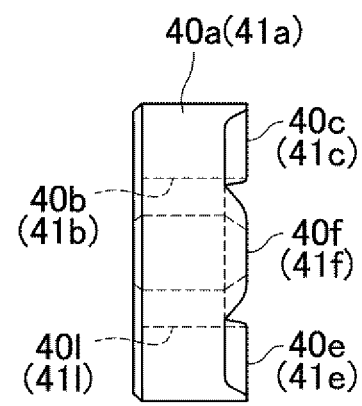
Figure 20A:
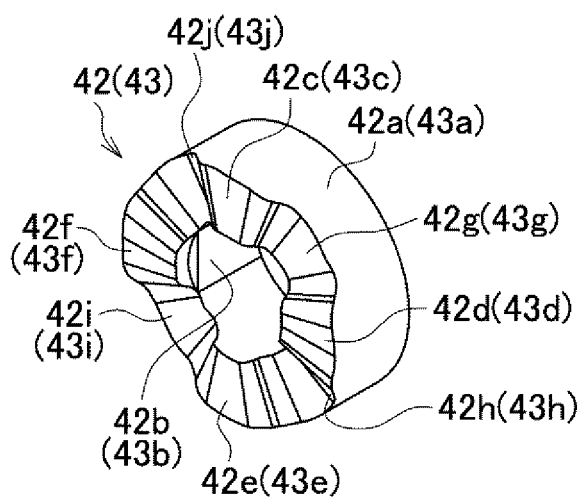
FIGS. 20A to 20C show a first (second) cam follower of a multiaxial hinge as shown in FIGS. 5 and 6, FIG. 20A being its perspective view, FIG. 20B—its elevation view and FIG. 20C—its left hand side view.
Figures 20B, 20C:
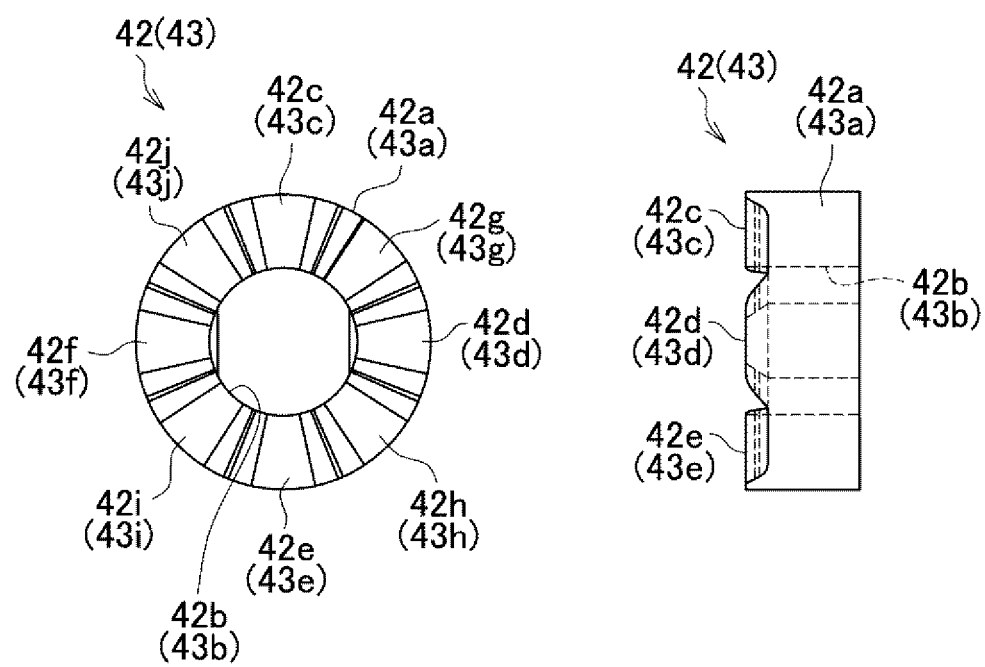
Figure 21A:
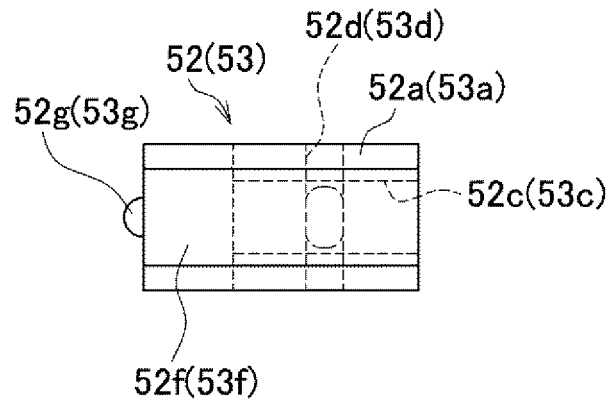
FIGS. 21A to 21C show a first (second) shaft end attaching member of a multiaxial hinge as shown in FIGS. 5 and 6, FIG. 21A being its elevation view, FIG. 21B—its left hand side view and FIG. 21C—its plan view.
Figure 21B:
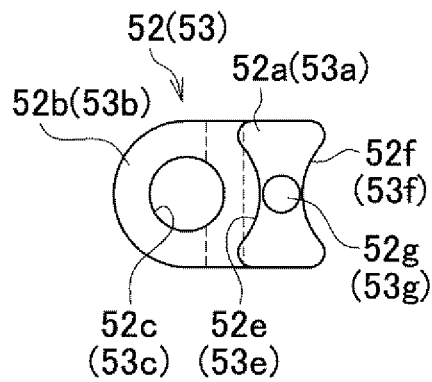
Figure 21C:
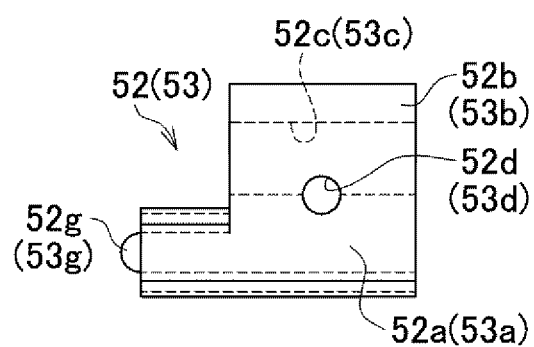
Figure 22A:
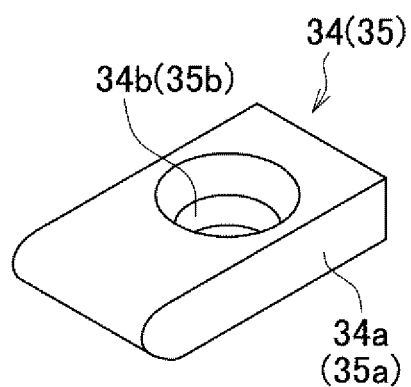
FIGS. 22A and 22B show a further different type of a first (second) spacer of a multiaxial hinge as shown in FIGS. 5 and 6, FIG. 22A being its perspective view and FIG. 22B—its left hand side view.
Figure 22B:
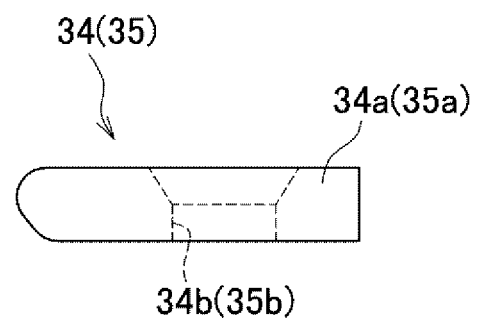

Next, as shown in FIGS. 5 and 6, friction mechanisms 36 consist of a first friction mechanism 36*a* provided on a first main hinge shaft 11 and a second friction mechanism 36b provided on a second main hinge shaft 12. In an embodiment in the drawings, the first friction mechanism 36a consists of a first friction washer 37 (see also FIG. 18), a coupling member 23 (see also FIG. 12) a first cam disc 40 (see also FIG. 19), and a first elastic means 44a provided on the first main hinge shaft 11 for bringing the above components into press contact. In the meantime, since a second friction mechanism 36b has an identical structure, respective reference numerals relevant to the second friction mechanism 36b in the drawings are added in parenthesis to those concerning the first friction mechanism, and thus redundant explanation is omitted hereinafter. A deformed shaft portion 11c (12c) of the first main hinge shaft 11 (12) passes through a deformed shaft hole 37b (38b) provided on a main body portion 37a (38a) of a first friction washer 37 (38), so that the first friction washer is restrained so as to be movable in an axial direction but non-rotatable around the axis, and thus attached to the first main hinge shaft 11 (12). As shown in FIGS. 5, 6 and 18, waffle-knurl patterns 37c, 37d (38c, 38d) are formed on the both sides of the first friction washer 37 (38). Moreover, a waffle-knurl pattern 23i (24i) is formed on one surface of an arc-shaped shaft portion 23b (24b) of a coupling member 23 (24) being one counterpart of the first friction washer 37 (38), and a waffle-knurl pattern 40k (41k) is equally formed on one surface of the first cam disc 40 (41) being other counterpart of the first friction washer 37 (38). In this manner, an enhanced friction effect is achieved when the first friction washer 37 (38) is brought into press contact with the arc-shaped shaft portion 23b (24b) of the coupling member 23 (24) and the first cam disc 40 (41).

The elastic means 44 consist of a first elastic means 44a provided on the first main hinge shaft 11 and a second elastic means 44b provided on the second main hinge shaft 12, as shown in FIGS. 5 and 6. The first elastic means 44a (44b) is intended to bring the first friction washer 37 (38), the arc-shaped shaft portion 23b (24b) of the coupling member 23 (24) and the first cam disc 40 (41) into press contact with each other and to enhance a friction effect between them; it is provided with a plurality of disc springs 45, 45 (46, 46) overlapping each other, then clamped with a clamping nut 49 (50) in order to generate an elastic force in an axial direction. The first elastic means 44a (44b) is also used as elastic means for first drawing mechanism 39a (39b) as described below.

As shown in FIGS. 5 and 6, drawing mechanisms 39 consist of a first drawing mechanism 39a provided on the first main hinge shaft 11 and a second drawing mechanism 39b provided on the second main hinge shaft 12. Since the second drawing mechanism 39b has a structure identical to the first drawing mechanism 39a, respective reference numerals relevant to the second drawing mechanism 39b are added in parenthesis to those concerning the first drawing mechanism, and thus redundant explanation is omitted hereinafter. In an embodiment as shown in the drawings, the first drawing mechanism 39a (39b) comprises a first cam disc 40 (41) (see also FIG. 19) and a first cam follower 42 (43) (see also FIG. 20); a first to a fourth cam convex portions 40c to 40f as well as a first to a fourth cam concave portions 40g to 40j are formed on a cam surface of a main body portion 40a (40a) of the first cam disc 40 (41), respectively at an equal interval of 90 degrees. Moreover, a detent key 40l (41l) is provided on an outer circumferential surface of the main body portion 28a (30a) of the first cam disc 40 (41). The detent key 40l (41l) is fitted into a key groove 23h (24h) (see FIG. 12A) provided on the coupling member 23 (24). This prevents the first cam disc 40 (41) from rotating together with a first main hinge shaft 11; thus the detent key is intended to prevent a rotation of the first cam disc 40 (41) together with the first main hinge shaft, when a first cam follower 42 (43) as described below rotates together with the first main hinge shaft 11. On the other hand, a first to a fourth cam convex portions 42c to 42f (43c to 43f) as well as a first to a fourth cam concave portions 42g to 42j (43g to 43j) are formed on a cam surface of a main body portion 42a (43a) of the first cam follower 42 (43) (see FIGS. 5 and 20), respectively at an equal interval of 90 degrees. As elastic means for press contact between a cam surface of the first cam disc 40 (41) and the one of the first cam follower 42 (43), a first elastic means 44a (44b) used for actuating a first friction mechanism 36a (36b) is also applicable to the first drawing mechanism 39a (39b).

In the following, reference is made to the operation of the multiaxial hinge 4 according to the invention as described above. When the notebook PC 1 is held by both hands and only one of the first casing 2 and the second casing 3 is opened and closed relative to other, the synchronous rotation mechanism 16 simultaneously opens and closes the casing not starting opening and closing operations yet. In this manner, the synchronous rotation mechanism 16 plays a role to reduce the time for the opening and closing operation and facilitate the operation.

Figure 24A:
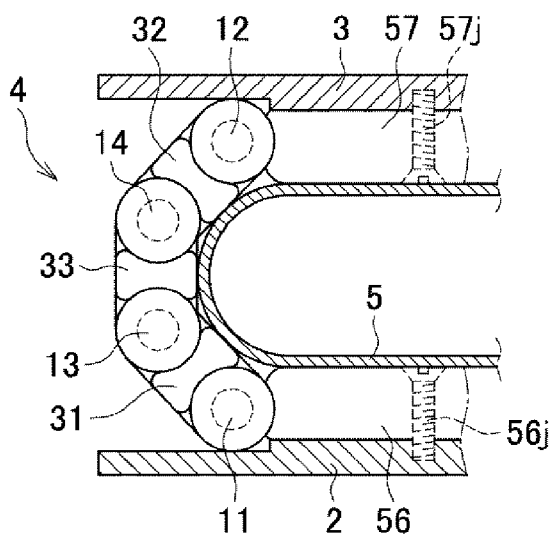
FIG. 24A to 24C show an explanatory views for illustrating an opening and closing operation of a first casing and a second casing to which multiaxial hinges according to the invention are attached.
Figure 24B:
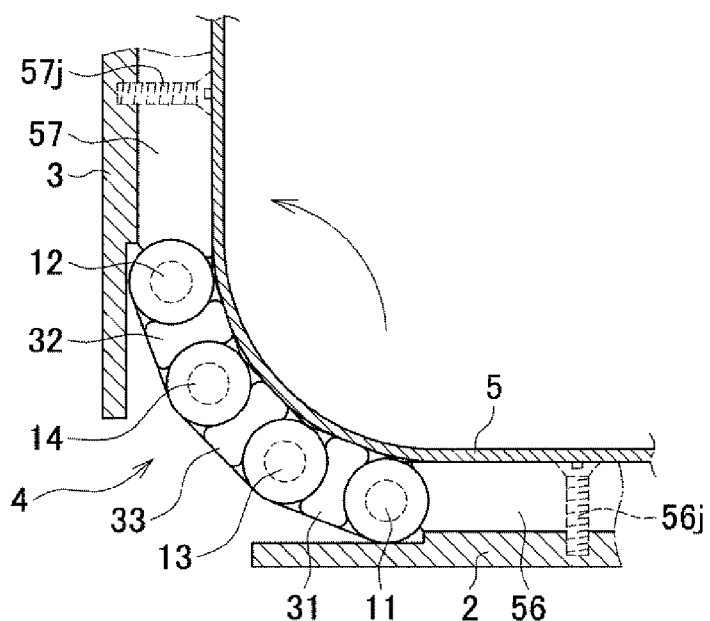
Figure 24C:
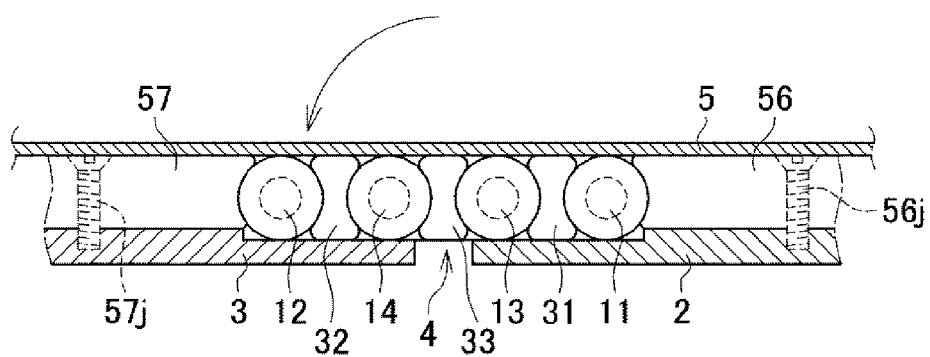

Concretely, when e.g. as shown in FIGS. 1A and 24A, the first casing 2 on the keyboard side is held with one hand from a position in which the first casing 2 is closed relative to the second casing 3, and the second casing 2 on the display side held by another hand is opened counterclockwise (FIG. 24A), the synchronous rotation mechanism 16 works to open the first casing 2 and the second casing 3 at the same time and at the same opening angle. In other words, the second bracket 57 attached to the second casing 3 and the second attaching member 18 (see FIG. 5) attached to the former rotate counterclockwise together with the second main hinge shaft 12 non-rotatably inserted through the second attaching member 18. In the meantime, if reference is simply made to "clockwise" and "counterclockwise" without specifying any drawing, these directions are referred to in the states with regard to the "front face" being a view as respective components shown in FIG. 5 are seen from below on the left hand side. However, the rotation directions of the first, the second and the third twin-bevel-gear-shaped intermediate gears 19, 20, 22 are referred to, with the "front face" being a view as those shown in FIG. 5 are seen from below on the right hand side. Due to the counterclockwise rotation of the second attaching member 18, the second twin-bevel-gear-shaped intermediate gear 20, which comprises the bevel-gear-shaped transmission gear 20b meshed with the bevel-gear-shaped drive gear 17d of the second attaching member 18, rotates counterclockwise. In this manner, the bevel-gear-shaped driven gear 21g of the rotating block 21 meshed with the other bevel-gear-shaped transmission gear 20c of the second twin-bevel-gear-shaped intermediate gear 20 is made to rotate clockwise around the second sub hinge shaft 14 rotatably inserted through the second circular shaft hole 21e of the rotating block 21, and the rotating block 21 itself is also made to rotate clockwise around the second sub hinge shaft 14. As described above, the rotating block 21 is made to rotate clockwise around the second sub hinge shaft 14, so that the first sub hinge shaft 13 inserted through the first circular shaft hole 21d on other end of the rotating block 21 is also made to rotate clockwise around the second sub hinge shaft 14. In other words, the first sub hinge shaft 13 is made to rotate around the second sub hinge shaft 14 in a direction in which it is opened relative to the second main hinge shaft 12. Thus, the first main hinge shaft 11 coupled to the first sub hinge shaft 13 via coupling members 27, 31, 23 is also made to rotate in a direction in which it is opened relative to the second main hinge shaft 12, therefore, the first attaching member 17 and the first bracket 56 non-rotatably attached to the first main hinge shaft 11 are also made to rotate in a direction in which it is opened relative to the second main hinge shaft 12. As described above, if a force to open the second casing 3 on the display side is applied in a counterclockwise direction, not only the second casing 3 is opened, but also the first casing 2 attached to the first bracket 56 are made to rotate in an opening direction. As a result, the second casing 3 and the first casing 2 rotate synchronously in mutually opposite directions, thus an opening operation is conducted in an efficient manner. This also applies to the closing operation, and when the second casing 3 moves in the closing direction, the first casing 2 also moves in the closing direction by means of the synchronous rotation mechanism 16. In this manner, the closing operation is quickly and efficiently accomplished.

Furthermore, when the first casing 2 on the keyboard side is held with one hand from a position in which the first casing 2 is closed relative to the second casing 3, and the second casing 2 on the display side held by another hand is opened counterclockwise as described above, at the same time, the second bracket 57 attached to the second casing 3 and the second attaching member 18 (see FIG. 5) fixed to the second casing are pushed to open in a counterclockwise direction, so this force also works via the second main hinge shaft 12 on the coupling member 24 to rotate around the second sub hinge shaft 14 in a counterclockwise direction. In an embodiment as shown in the drawings, the third twin-bevel-gear-shaped intermediate gear 22 is rotatably housed in the intermediate gear housing concave portion 21h of the rotating block 21, and the bevel-gear-shaped driven gears 22b, 22c (see FIG. 10) formed on periphery on its both surfaces are meshed with the bevel-gear-shaped gear 23f of the coupling member 23 and the bevel-gear-shaped gear 24f of the coupling member 24. Therefore, when the coupling member 24 rotates around the second sub hinge shaft 14 in a counterclockwise direction as described above, the third twin-bevel-gear-shaped intermediate gear 22 meshed with the bevel-gear-shaped gear 24f of the coupling member 24 is made to rotate in a counterclockwise direction, and thus the bevel-gear-shaped gear 23f of the coupling member 23 is made to rotate in a clockwise direction, so that the coupling member 23 rotates around the first sub hinge shaft 13 in a clockwise direction; accordingly, the first main hinge shaft 11 inserted through the first circular shaft hole 23c of the coupling member 23 also rotates around the first sub hinge shaft 13 in a clockwise direction, and the first casing 2 of the notebook PC, etc. as attached to the first main hinge shaft 11 via the first attaching member 17 and the first bracket 56 is also made to rotate in a direction in which it is opened relative to the second casing 3. As a result, the second casing 3 and the first casing 2 rotate synchronously in mutually opposite directions, thus an opening operation is conducted in a more efficient manner.

In the meantime, an operation on the contrary to what is described above is also possible, such that the first casing 2 on the keyboard side is opened in a clockwise direction. The operation in this case is conducted in the same manner as is described above, starting from the clockwise rotation of the first bracket 56, so reference thereto is omitted.

In this manner, if one of the first casing 2 and the second casing 3 is opened and closed using the multiaxial hinge 4 according to the invention, the other casing also opens and closes at the same time by means of the synchronous rotation mechanism 16. Therefore, the first casing 2 and the second casing 3 is more easily and more quickly opened and closed, which enhances ease of operation.

Figure 25A:
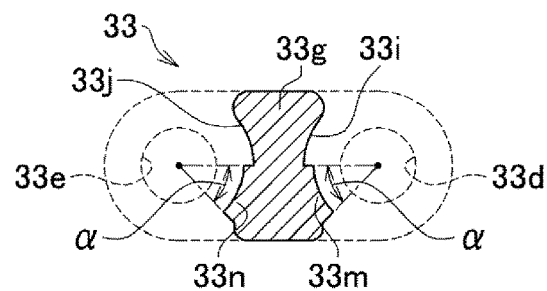
FIGS. 25A to 25D show explanatory views of a stopper means of a multiaxial hinge as shown in FIGS. 5 and 6, FIG. 25A being a cross section perpendicular to the axis for illustrating a stopper convex portion (being a part of the stopper means) of a coupling member, FIG. 25B—a cross section perpendicular to the axis for illustrating a stopper concave portion (being a part of the stopper means) of a different coupling member, FIG. 25C—a cross section perpendicular to the axis of the stopper means in fully opened state, and FIG. 25D—a cross section perpendicular to the axis of the stopper means in closed state.
Figure 25B:
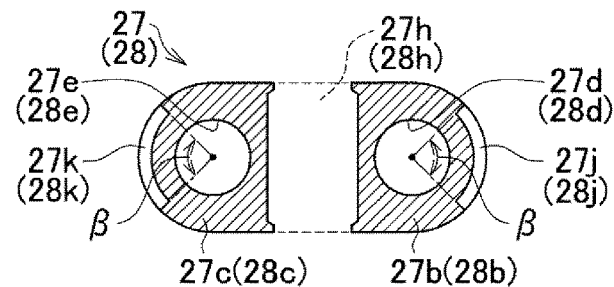
Figure 25C:
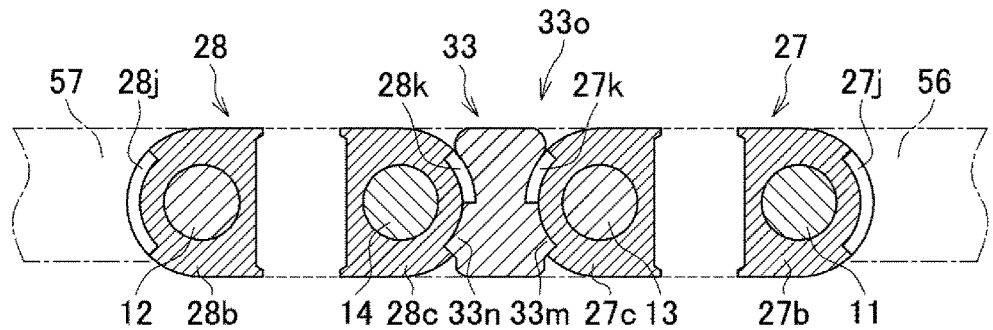
Figure 25D:
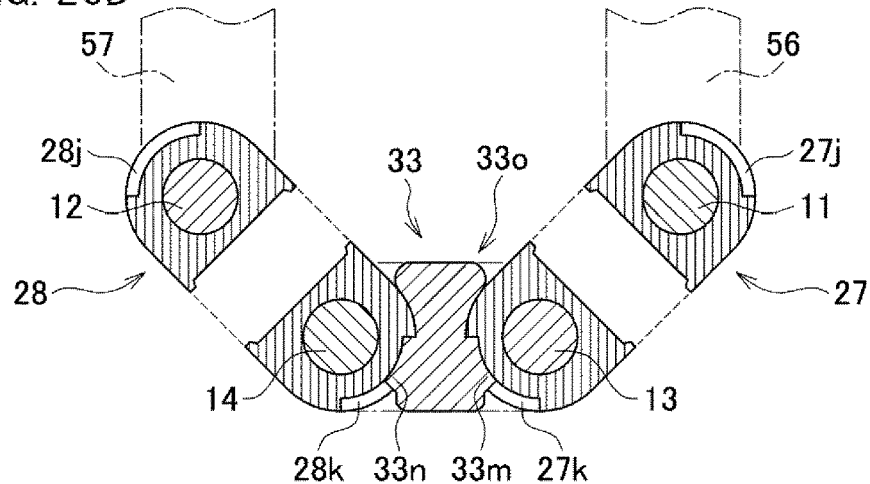

The stopper means 33o plays a role to regulate the maximum opening angle of the first casing 2 and the second casing 3 to 180 degrees or slightly larger, in order to prevent the display sheet 5 from being bent outwards more than required, and to avoid damages to the display sheet 5 due to bending, when the minimum bending angle of the bent portion 4a of the multiaxial hinge 4 is smaller than the predetermined angle in the closed state of the first casing 2 and the second casing 3. In other words, when the first bracket 56 attached to the first casing 2 (not shown in FIG. 25C) and the second bracket 57 attached to the second casing are in the fully opened state as shown in FIG. 25C, the lower end surfaces of the stopper concave portions 27k, 28k provided on the coupling members 27, 28 abut against the lower end surfaces of the stopper convex portions 33m, 33n provided on the coupling member 33 to block a further opening operation (i.e. an operation when the angle between the coupling members 27, 28 is 180 degrees or larger). On the other hand, when the first bracket 56 attached to the first casing 2 and the second bracket 57 attached to the second casing are in the closed state as shown in FIG. 25D, the upper end surfaces of the stopper concave portions 27k, 28k provided on the coupling members 27, 28 abut against the upper end surfaces of the stopper convex portions 33m, 33n provided on the coupling member 33 to block a further opening operation (i.e. an operation when the angle between the coupling members 27, 28 is 90 degrees or smaller). This regulated range of the opening and closing angle is possible if the central angle α between the stopper convex portions 33m, 33n provided on the coupling member 33 is e.g. 45 degrees and the central angle β between the stopper concave portions 27k, 28k provided on the coupling members 27, 28 is e.g. 90 degrees, and appropriate changes to these angles allow for modifications to the regulated range of the opening and closing angle. Normally it is preferable to set respective movable angles (β-α) of the coupling members 27, 28 relative to the coupling member 33, from the position of the coupling members 27, 28 being opened 180 degrees state as shown in FIG. 25C to their position in the closed state as shown in FIG. 25D, within a range of 45 to 50 degrees. In the meantime, though in the embodiment as shown in the drawings, the stopper concave portions are provided on the coupling members 27, 28 and the stopper convex portions are provided on the coupling member 33, the stopper concave portions can be also provided on the coupling member 33, and the stopper convex portions can be also provided on the coupling members 27, 28, on the contrary to this arrangement. However, if the coupling members 27, 28 have the form identical to the rotating block 21 as in the embodiment as shown in the drawings, the arrangement is not limited thereto.

In other words, in the opening operation of the first casing 2 and the second casing 3, the stopper means 33o blocks the casings to be opened 180 degrees or more as shown in FIG. 25C, while in their closing operation, it regulates respective closing angles of the coupling members 27, 28 relative to the coupling member 33 to 45 degrees, as shown in FIG. 25D. In this manner, the minimum bending angle of the display sheet 5 to be folded is maintained. Although the rotation movement of the coupling members 27, 28 is regulated by the stopper means 33o in the closing operation of the first casing 2 and the second casing 3, the shaft holes 27e and 28e of the coupling members 27, 28 through which the first main hinge shaft 11 and the second main hinge shaft 12 are respectively inserted are both circular, so that even in case of engagement between the deformed shaft holes 17b, 18b of the first attaching member 17 and the second attaching member 18 on the one hand, and the first main hinge shaft 11 and the second main hinge shaft 12 on the other, the first casing 2 and the second casing 3 are closed without being regulated in their closing operation, until the first casing 2 and the second casing 3 abut against each other, one facing other. This state is shown in FIGS. 24A and 25D.

As per the first friction mechanism 36a (the second friction mechanism 36b) of the friction mechanisms 36, in the opening and closing operation of the first casing 2 and the second casing 3 relative to each other as described above, the both surfaces having the waffle-knurl patterns 37c, 37d (38c, 38d) of the first friction washer 37 (the second friction washer 38) rotating together with the first main hinge shaft 11 (the second main hinge shaft 12) is under press contact with the surface having the waffle-knurl pattern 23i (24i) of the coupling members 23 (24) and the surface having the waffle-knurl pattern 40k (41k) of the first cam disc 40 (the second cam disc 41), with being sandwiched between these surfaces, due to an effect of the first elastic means 44a (the second elastic means 44b); in this manner, the friction mechanisms generate the friction torque to the rotation of the first main hinge shaft 11 (the second main hinge shaft 12), thus enable the stable stop effect to take place at any angular position of the first casing 2 and the second casing 3 in their opening and closing operation.

The drawing mechanisms 39 start functioning slightly before the opening and closing angle of 0, 90 or 180 degrees, so that under an effect of the first elastic means 44a (the second elastic means 44b), the first to the fourth cam convex portions 42c to 42f of the first cam follower 42 fall onto the first to the fourth cam concave portions 40g to 40j of the first cam disc 40, while the first to the fourth cam convex portions 43c to 43f of the second cam follower 43 as well fall onto the first to the fourth cam concave portions 41g to 41j of the second cam disc 41. In this manner, the drawing mechanism 39 assumes the drawing function, in order to rotatably urge (draw) the first casing 2 and the second casing 3 in the opening direction or the closing direction in an automatic manner. Respective disc springs of the first elastic means 44a and the second elastic means 44b are squeezed and their elastic force is enhanced at any position between the above-mentioned angles, i.e. within a range of angles in which the first to the fourth cam convex portions 42c to 42f of the first cam follower 42 respectively run over the first to the fourth cam concave portions 40g to 40j of the first cam disc 40, and the first to the fourth cam convex portions 43c to 43f of the second cam follower 43 run over the first to the fourth cam concave portions 41g to 41j of the second cam disc 41. This assures a stable stopping effect of the first casing 2 and the second casing 3 at any angular position.

Additionally, in the multiaxial hinges 4, 4 according to the invention, all the elements composing these multiaxial hinges have equal height (thickness) in order to prevent the damages to the display sheet 5, even if it is placed on the upper surfaces of the multiaxial hinges. More strictly, when the first casing 2 and the second casing 3 are opened such that their inner surfaces are flush in the same plane and also the first main hinge shaft 11, the second main hinge shaft 12, the first sub hinge shaft 13 and the second sub hinge shaft 14 are flush in the same plane, the sizes of these components are all set such that all the top surfaces, and more preferably all the top surfaces both on the inner surface sides and the outer surface sides of all the components composing the multiaxial hinges 4, 4 are flush in the same flat plane; here all these components are structured to prevent one of them from protruding or having recess.

Still further, spacers (25, 26, etc.) for filling the gaps are provided on sections having the gaps greater than the predetermined area between the above-mentioned top surfaces of all the components as well as on the above-mentioned top surfaces of these components. First, the spacer 34 filling the gap on the concave portion 56h of the first bracket 56, as well as the spacer 35 filling the gap on the concave portion 57h of the second bracket 57 belong to such spacers. Still further, the gaps to be most urgently addressed in the present invention are the gaps made of substantially V-shaped grooves formed between cylindrical surfaces of adjacent elements; thus the spacers need to be provided to fill the gaps. In the embodiment as shown in the drawings, the spacers 25, 26 belong to such spacers, and the coupling members 31, 32, 33, and 51 also function as such spacers. First, as per the spacer 25 (26) (see FIGS. 5, 6, 13), as described above, the arc-shaped concave portions 25b to 25e (26b to 26e) provided on the both ends and the both side surfaces of its main body portion 25a (26a) are inserted between various elements, facing the cylindrical surfaces of these elements, so that the spacer fills the gaps made of substantially V-shaped grooves as mentioned above. First, as per the respective first partitions and the respective second partitions of the coupling members 31, 32, 33, 51 as described above, the arc-shaped concave portions formed on their side surfaces are inserted between various elements, facing the cylindrical surfaces of these elements, so that the coupling members fill the gaps made of substantially V-shaped grooves as mentioned above.

As described above, the spacers can be attached in various modes: (a) as in the spacers 34, 35, they can be directly attached to elements having the concave portions 56h, 57h; (b) as in the spacers 25, 26, they can be pivotally supported by making them to abut against other adjacent elements; and (c) as in the coupling members 31, 32, 33, 51 also functioning as spacers, they can be supported by the first and the second main hinge shafts 11, 12, as well as the first and the second sub hinge shafts 13, 14 passing through them.

In the meantime, the present invention is not limited to the embodiment as described above, and in addition to the multiaxial hinges as described above, it is also compatible with hinge mechanisms of various structures, as long as the hinges are biaxial to heptaxial hinges. Still further, the spacers can be attached in various modes, and even other than those described above, and the shapes of the spacers are also adjustable as appropriate depending on the situations of use. Still further, elastic means 44 as described above can be replaced with compression coil springs or the ones made of materials such synthetic resin. Accordingly, the present invention encompasses all the variant embodiments to which the skilled person could easily reach starting from the foregoing and drawings, always within the scope of the claims.

The present invention is constructed as described above, therefore, the multiaxial hinges can be provided, wherein they have effects, that the first casing and the second casing of the electronic device such as a notebook PC which are covered with a single-piece flexible display sheet are coupled below the display sheet via the multiaxial hinges according to the invention; that the bent portion can be formed, wherein the display sheet does not break in the closed state of the first casing and the second casing; that the first casing and the second casing can be synchronously opened and closed; and that in the fully opened state of the first casing and the second casing, the multiaxial hinges are flush with the first casing and the second casing without protruding upwards; wherein with the friction mechanisms as described above, the first casing and the second casing can be opened and closed at free stop, as well as with the drawing mechanisms, the first casing and the second casing can be automatically opened and closed, just before their closed state and fully opened state, and in this sense, the multiaxial hinges have excellent efficiency and operability of the opening and closing operation; still further, using such multiaxial hinges, an easy-to-handle, thin electronic device with a large sized and flexible display sheet can be provided.

What is claimed is:

1. A multiaxial hinge used as attached below a flexible and touch-operable display sheet for opening and closing a first casing and a second casing, said display sheet being attached so as to cover both inner surfaces of said both casings, a plurality of hinge shafts being provided, a first bracket attached to said first casing and a second bracket attached to said second casing being coupled together via a plurality of coupling members, and a synchronous rotation mechanism, a stopper means and a friction mechanism either all in cooperation or each independently from each other being provided on each of said hinge shafts, said multiaxial hinge being designed so as to form a bent portion on said inner surfaces in a closed state of said first casing and said second casing, and to keep said first casing and said second casing flush in a fully opened state of said casings.

2. A multiaxial hinge used as attached below a flexible and touch-operable display sheet for opening and closing a first casing and a second casing, said display sheet being attached so as to cover both inner surfaces of said both casings, a plurality of hinge shafts being provided, a first bracket attached to said first casing and a second bracket attached to said second casing being coupled together via a plurality of coupling members, and a synchronous rotation mechanism, a stopper means, a friction mechanism and a drawing mechanism, either all in cooperation or each independently from each other being provided on each of said hinge shafts, said multiaxial hinge being designed so as to form a bent portion on said inner surfaces in a closed state of said first casing and said second casing, and to keep said first casing and said second casing flush in a fully opened state of said casings.

3. The multiaxial hinge according to claim 1, said plurality of hinge shafts being made up of a first main hinge shaft, a second main hinge shaft, a first sub hinge shaft and a second sub hinge shaft, and said coupling members including coupling members rotatably coupling adjacent ones of said plurality of hinge shafts.

4. The multiaxial hinge according to claim 1, said plurality of coupling members being made up of a coupling member for coupling said first bracket and said second bracket to said first main hinge shaft and said second main hinge shaft, a coupling member for coupling said first sub hinge shaft and said second sub hinge shaft to said first main hinge shaft and said second main hinge shaft, and a coupling member for coupling said first sub hinge shaft to said second sub hinge shaft.

5. The multiaxial hinge according to claim 3,
said synchronous rotation mechanism comprising: a first attaching member and a second attaching member, respectively attached to a first main hinge shaft and a second main hinge shaft, with respective rotation thereof being restrained, said first attaching member and said second attaching member respectively comprising bevel-gear type drive gears having said first main hinge shaft and said second main hinge shaft as central axes, on shaft end surfaces thereof, said first main hinge shaft and said second main hinge shaft being inserted therein, and said first bracket and said a second bracket being attached to said first attaching member and said second attaching member;

a rotating block, said first sub hinge shaft and said second sub hinge shaft being inserted therein, and respectively comprising bevel-gear type driven gears having said first sub hinge shaft and said second sub hinge shaft as central axes, on shaft end surfaces thereof;

a first twin-bevel-gear type intermediate gear for transmitting a rotation of said bevel-gear type drive gear of said first attaching member to a first bevel-gear type driven gear of said rotating block;

a second twin-bevel-gear type intermediate gear for transmitting a rotation of a first bevel-gear type drive gear of said first attaching member to a second bevel-gear type driven gear of said rotating block;

a third twin-bevel-gear type intermediate gear rotatably held by said rotating block so as to rotate around an axis parallel to an axis of said first twin-bevel-gear type intermediate gear and said second twin-bevel-gear type intermediate gear;

a coupling member being one of said plurality of coupling members, comprising a bevel-gear type gear meshed with one of said bevel-gear type driven gears, and said first main hinge shaft and said first sub hinge shaft being inserted therein; and a coupling member being one of said plurality of coupling members, comprising a bevel-gear type gear meshed with other of said bevel-gear type driven gears, and second main hinge shaft and said second sub hinge shaft being inserted therein.

6. The multiaxial hinge according to claim 3,
said stopper means comprising: a coupling member being one of said plurality of coupling members, said first main hinge shaft and said first sub hinge shaft being inserted therein, a stopper concave portion or a stopper convex portion being formed on an outer surface thereof;

a coupling member being other of said plurality of coupling members, said second main hinge shaft and said second sub hinge shaft being inserted therein, a stopper concave portion or a stopper convex portion being formed on an outer surface thereof; and a coupling member being one of coupling members adjacent to said two coupling members, said stopper concave portion or said stopper convex portion being formed thereon, said first sub hinge shaft and said second sub hinge shaft being inserted through said coupling member, said coupling member comprising a stopper convex portion and a stopper concave portion engaging said stopper concave portion or said stopper convex portion of said two coupling members being formed on an outer surface thereof.

7. The biaxial hinge according to claim 3,
said friction mechanism attached to said first main hinge shaft and said second main hinge shaft, with a rotation thereof being restrained, said friction mechanism comprising: a first friction washer and a second friction washer;

Two of said plurality of coupling members, each abutting against one surface of one of said first friction washer and said second friction washer, said first main hinge shaft and said second main hinge shaft being rotatably inserted therein;

a first cam disc and a second cam disc, each comprising a surface with a waffle-knurl pattern abutting against other surface of one of said first friction washer and said second friction washer, said first cam disc and said second cam disc being provided so as to rotate together with said two coupling members on said first main hinge shaft and said second main hinge shaft; and a first elastic means and a second elastic means for bringing said two coupling members and said first cam disc and said second cam disc into press contact with said first friction washer and said second friction washer.

8. The multiaxial hinge according to claim 2, said drawing mechanism comprising: a first cam disc and a second cam disc provided so as to rotate together with said two coupling members on said first main hinge shaft and said second main hinge shaft as well as with two of said plurality of coupling members provided so as to rotate relative to said first main hinge shaft and said second main hinge shaft;

a first cam follower and a second cam follower provided on said first main hinge shaft and said second main hinge shaft with a rotation thereof being restrained, each comprising a cam surface working together with a cam surface of said first cam disc and said second cam disc; and a first elastic means and a second elastic means for bringing said cam surface of said first cam follower and said second cam follower into press contact with said cam surface of said first cam disc and said second cam disc.

9. An electrical device comprising a first casing and a second casing having the multiaxial hinge according to claim 1 disposed between the first casing and the second casing.

10. The electrical device according to claim 9, a single-piece flexible display sheet being provided so as to widely cover inner surfaces of said first casing and said second casing, and a substantially central portion of said display sheet is fixed to said multiaxial hinge.

* * * * *